US012793658B2

(12) United States Patent
Ishihara et al.

(10) Patent No.: US 12,793,658 B2

(45) **Date of Patent: *Nov. 10, 2026**

(54) DISPLAY DEVICE WITH DISPLAY PANEL, DIMMING PANEL, AND BLURRING PROCESS

(71) Applicant: Magnolia White Corporation, Tokyo (JP)

(72) Inventors: Tomoyuki Ishihara, Tokyo (JP); Tomohide Oohira, Tokyo (JP); Yasuhiko Yamagishi, Tokyo (JP)

(73) Assignee: Magnolia White Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 19/225,695

(22) Filed: Jun. 2, 2025

(65) Prior Publication Data

US 2025/0292740 A1 Sep. 18, 2025

Related U.S. Application Data

(60) Division of application No. 18/584,117, filed on Feb. 22, 2024, now Pat. No. 12,340,762, which is a (Continued)

(30) Foreign Application Priority Data

Apr. 14, 2022 (JP) ................................ 2022-066993

(51) Int. Cl.

*G09G 3/34* (2006.01)
*G09G 3/36* (2006.01)

(52) U.S. Cl.

CPC ................ *G09G 3/34* (2013.01); *G09G 3/36* (2013.01); *G09G 2300/023* (2013.01); *G09G 2320/0233* (2013.01); *G09G 2320/028* (2013.01)

(58) Field of Classification Search

CPC ............ G09G 3/34–3426; G09G 3/36; G09G 2300/023; G09G 2320/0233; G09G 2320/028

See application file for complete search history.

(56) References Cited

U.S. PATENT DOCUMENTS 6,959,117 B2 * 10/2005 Ratner ...................... G06T 5/70 375/E7.081
7,843,529 B2 * 11/2010 Ikeno ............... G02F 1/133514 348/82

(Continued)

*Primary Examiner* — Gene W Lee

(74) *Attorney, Agent, or Firm* — K&L Gates LLP

(57) ABSTRACT

A display device includes: a display panel with pixels; a dimming panel with dimming pixels; and a light source. When a pixel is controlled to be lit in white and a predetermined condition is satisfied, a blurring region is formed, and light from the light source is transmitted through the blurring region and the pixel. When a pixel is controlled to be lit up in white and the predetermined condition is not satisfied, the blurring region is not formed, the dimming pixel overlapping the pixel on a straight line along a direction in which the display panel faces the dimming panel is controlled to transmit light, and light from the light source is transmitted through the dimming pixel and the pixel. The predetermined condition is satisfied when the pixel controlled to be lit in white is at a predetermined distance or farther from an outer edge of a display area.

3 Claims, 14 Drawing Sheets

Related U.S. Application Data continuation of application No. 18/133,041, filed on Apr. 11, 2023, now Pat. No. 11,942,048.

(56) References Cited

U.S. PATENT DOCUMENTS

| | | | | |
|---|---|---|---|---|
| 10,311,612 | B2 * | 6/2019 | Kamiyoshihara | G09G 3/3611 |
| 10,937,376 | B2 * | 3/2021 | Hirotsune | G09G 3/3648 |
| 2002/0114532 | A1 * | 8/2002 | Ratner | G06T 5/70<br>375/E7.081 |
| 2007/0242186 | A1 * | 10/2007 | Ikeno | G02F 1/13471<br>349/74 |
| 2011/0032454 | A1 * | 2/2011 | Ikeno | G02F 1/133514<br>349/81 |
| 2019/0139500 | A1 * | 5/2019 | Tada | G09G 3/3406 |
| 2020/0118502 | A1 * | 4/2020 | Hirotsune | G02F 1/1323 |
| 2021/0142746 | A1 * | 5/2021 | Hirotsune | G02F 1/13338 |
| 2021/0181560 | A1 * | 6/2021 | Wang | G02F 1/133615 |
| 2023/0114708 | A1 * | 4/2023 | Harada | G09G 3/3406<br>345/694 |

* cited by examiner

DISPLAY DEVICE WITH DISPLAY PANEL, DIMMING PANEL, AND BLURRING PROCESS

CROSS-REFERENCE TO RELATED APPLICATIONS

The present application is a divisional of U.S. patent application Ser. No. 18/584,117, filed on Feb. 22, 2024, which application is continuation of U.S. patent application Ser. No. 18/133,041, filed on Apr. 11, 2023, now U.S. Pat. No. 11,942,048 issued on Mar. 26, 2024, which claims priority from Japanese Patent Application No. 2022-066993 filed on Apr. 14, 2022, the entire contents of which are incorporated herein by reference.

BACKGROUND

1. Technical Field

What is disclosed herein relates to a display device.

2. Description of the Related Art

A configuration is known in which a dimming panel is provided between a liquid crystal display panel and a light source to increase contrast of an image (for example, International Application Publication No. WO2019/225137).

By making the region in which the dimming panel transmits light wider than the region of pixels controlled to transmit the light by a liquid crystal display panel, the image can be viewed with good display quality regardless of the position from which a user views the image, such as from an oblique point of view. However, if the region in which the dimming panel transmits the light is unconditionally made wider than the region of pixels controlled to transmit the light by the liquid crystal display panel at and near the outer edge of the display panel, the image may be output as if unintended light leakage occurs at and near the outer edge.

For the foregoing reasons, there is a need for a display device capable of both providing higher image contrast and reducing the output of an image as if unintended light leakage occurs at and near the outer edge of a display panel.

SUMMARY

According to an aspect, a display device includes: a display panel comprising a plurality of pixels; a dimming panel that is disposed so as to face the display panel on one surface side of the display panel and comprises a plurality of dimming pixels; and a light source configured to emit light that travels from the dimming panel toward the display panel. When any of the pixels is controlled to be lit up in white in accordance with an input image signal, and a predetermined condition is satisfied, a blurring process is applied so that more than one of the dimming pixels transmit light, a blurring region is formed that is a region including the dimming pixels to which the blurring process is applied, and light from the light source is transmitted through the blurring region and the pixel and emitted to another surface side of the display panel. When any of the pixels is controlled to be lit up in white in accordance with the input image signal and the predetermined condition is not satisfied, the blurring region is not formed, any of the dimming pixels located in a position overlapping the pixel on a straight line along a direction in which the display panel faces the dimming panel is controlled to transmit light, and light from the light source is transmitted through the dimming pixel and the pixel and emitted to the other surface side of the display panel. The predetermined condition is satisfied when the pixel that is controlled to be lit up in white is at a predetermined distance or farther from an outer edge of a display area provided with the pixels on the display panel.

DETAILED DESCRIPTION

Figure 1:
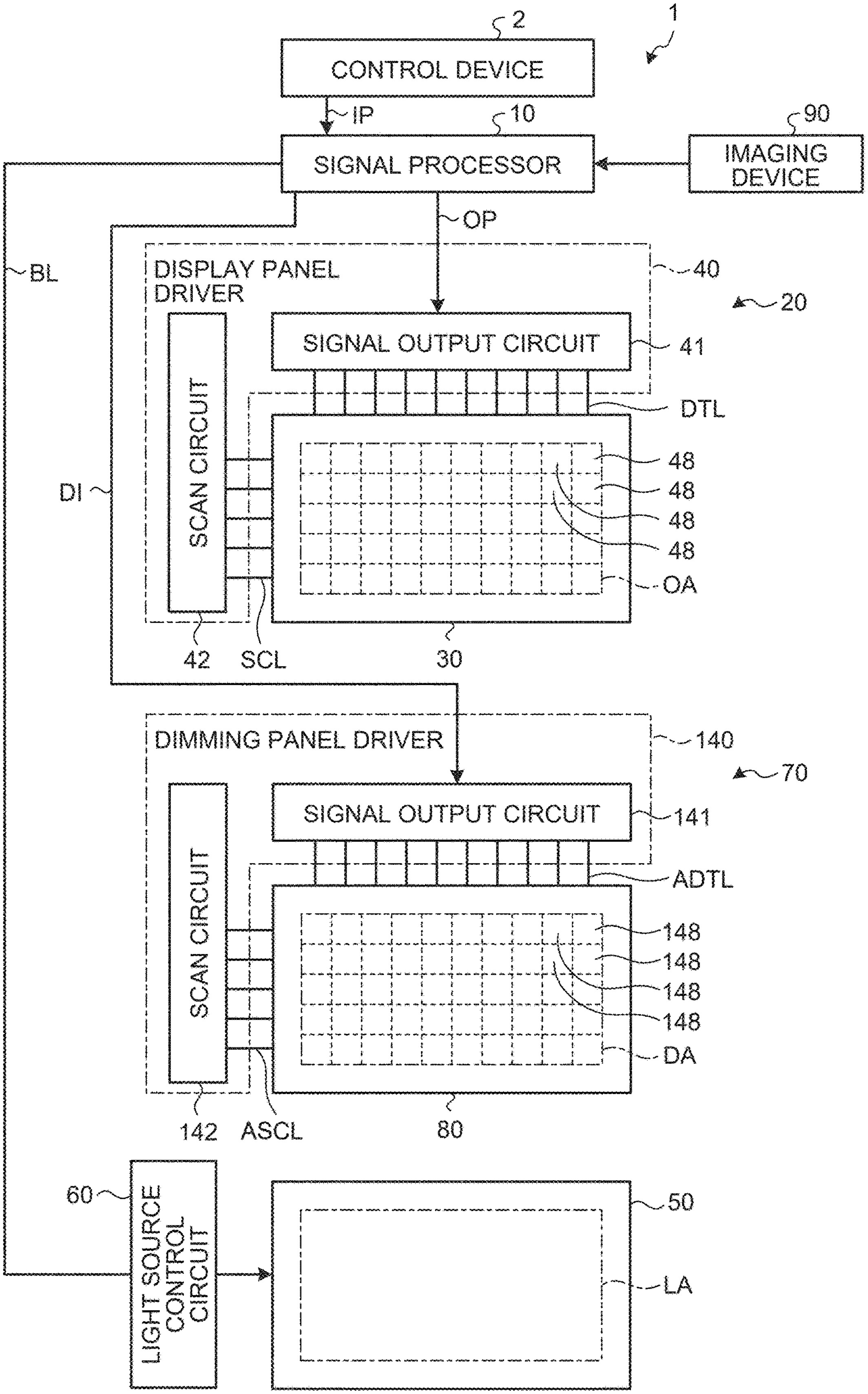
FIG. 1 is a diagram illustrating a main configuration example of a display device according to an embodiment.

The following describes an embodiment of the present disclosure with reference to the drawings. What is disclosed herein is merely an example, and the present disclosure naturally encompasses appropriate modifications easily conceivable by those skilled in the art while maintaining the gist of the invention. To further clarify the description, the drawings schematically illustrate, for example, widths, thicknesses, and shapes of various parts as compared with actual aspects thereof, in some cases. However, they are merely examples, and interpretation of the present disclosure is not limited thereto. The same element as that illustrated in a drawing that has already been discussed is denoted by the same reference numeral through the description and the drawings, and detailed description thereof will not be repeated in some cases where appropriate.

In this disclosure, when an element is described as being "on" another element, the element can be directly on the other element, or there can be one or more elements between the element and the other element.

FIG. 1 is a diagram illustrating a main configuration example of a display device 1 according to an embodiment. The display device 1 of the embodiment includes a signal processor 10, a display part 20, a light source device 50, a light source control circuit 60, a dimmer (light control device) 70, and an imaging device 90. The signal processor 10 performs various types of output based on an input signal IP received from an external control device 2, and thus controls operations of the display part 20, the light source device 50, and the dimmer 70. The signal processor 10 may be, for example, one integrated circuit having a function of performing the control mentioned above or may have a configuration in which a plurality of circuits are combined to perform the function. The input signal IP is a signal serving as data for outputting an image to be displayed on the display device 1 and is, for example, a red-green-blue (RGB) image signal. The input signal IP corresponds to the resolution of a display panel 30. That is, the input signal IP includes pixel signals corresponding to the number of pixels 48 and arrangement thereof in X and Y directions of the display panel 30 (to be described later). The signal processor 10 outputs, to the display part 20, an output image signal OP generated based on the input signal IP. The signal processor 10 also outputs, to the dimmer 70, a dimming signal DI generated based on the input signal IP. After receiving the input signal IP, the signal processor 10 outputs, to the light source control circuit 60, a light source drive signal BL for controlling lighting of the light source device 50. The light source control circuit 60 is, for example, a driver circuit of the light source device 50 and operates the light source device 50 in response to the light source drive signal BL. The light source device 50 includes a light source that emits light from a light-emitting area LA. In the embodiment, the light source control circuit 60 operates the light source device 50 so as to emit a constant amount of light from the light-emitting area LA of the light source device 50 in accordance with display timing of a frame image.

The display part 20 includes the display panel 30 and a display panel driver (display panel driving circuit) 40. The display panel 30 has a display area OA provided with the pixels 48. The pixels 48 are arranged, for example, in a matrix having a row-column configuration. The display panel 30 of the embodiment is a liquid crystal image display panel. The display panel driver 40 includes a signal output circuit 41 and a scan circuit 42. The signal output circuit 41 is a circuit serving as what is called a source driver, and drives the pixels 48 in accordance with the output image signal OP. The scan circuit 42 is a circuit serving as what is called a gate driver, and outputs a drive signal that scans the pixels 48 arranged in a matrix having a row-column configuration in units of a predetermined number of rows (for example, in units of one row). The pixels 48 are driven so as to output gradation values corresponding to the output image signal OP at the time of the output of the drive signal.

The dimmer 70 adjusts the amount of light that is emitted from the light source device 50 and is output through the display area OA. The dimmer 70 includes a dimming panel (light control panel) 80 and a dimming panel driver (dimming panel driving circuit) 140. The dimming panel 80 has a dimming area (light control area) DA provided so as to be capable of varying transmittance of light. The dimming area DA is disposed in a position overlapping the display area OA when viewed from a front point of view. The dimming area DA covers the entire display area OA when viewed from the front point of view. The light-emitting area LA covers the entire display area OA and the entire dimming area DA when viewed from the front point of view. The front point of view refers to a point of view from which an XY-plane is viewed from the front.

Figure 2:
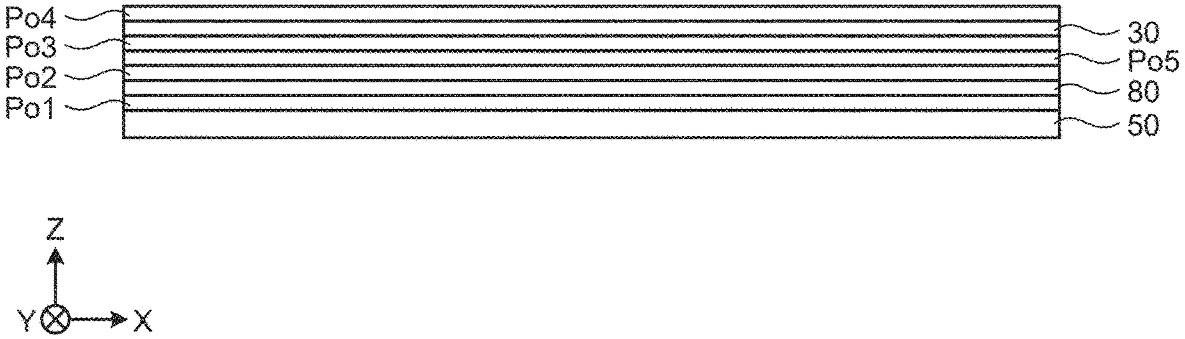
FIG. 2 is a view illustrating a positional relation between a display panel, a dimming panel, and a light source device.

FIG. 2 is a view illustrating a positional relation between the display panel 30, the dimming panel 80, and the light source device 50. In the embodiment, the display panel 30, the dimming panel 80, and the light source device 50 are stacked as illustrated in FIG. 2. Specifically, the dimming panel 80 is stacked on a light-emitting surface side of the light source device 50 from which the light is emitted. The display panel 30 is stacked on a side opposite to the light source device 50 with the dimming panel 80 interposed therebetween. The light emitted from the light source device 50, the amount of which is adjusted by the dimming area DA of the dimming panel 80, illuminates the display panel 30. The display panel 30 is illuminated from a back surface side thereof where the light source device 50 is located, and outputs the image for display to a side (display surface side) opposite to the back surface side. In this manner, the light source device 50 serves as a backlight that illuminates the display area OA of the display panel 30 from the back surface thereof. In the embodiment, the dimming panel 80 is provided between the display panel 30 and the light source device 50.

Hereinafter, a Z-direction refers to a direction in which the display panel 30, the dimming panel 80, and the light source device 50 are stacked. The X-direction and the Y-direction refer to two directions orthogonal to the Z-direction. The X-direction is orthogonal to the Y-direction. The pixels 48 are arranged in a matrix having a row-column configuration along the X-direction and the Y-direction. Specifically, h denotes the number of the pixels 48 arranged in the X-direction, and v denotes the number of the pixels 48 arranged in the Y-direction. h and v are natural numbers equal to or larger two.

A first polarizer Po1 is provided on the back surface side of the dimming panel 80. A second polarizer Po2 is provided on the display surface side of the dimming panel 80. A third polarizer Po3 is provided on the back surface side of the display panel 30. A fourth polarizer Po4 is provided on the display surface side of the display panel 30. A diffusion layer Po5 is provided between the second polarizer Po2 and the third polarizer Po3. Each of the first polarizer Po1, the second polarizer Po2, the third polarizer Po3, and the fourth polarizer Po4 transmits light polarized in a certain direction, and does not transmit light polarized in other directions. The direction of polarization of the polarized light transmitted by the first polarizer Po1 is orthogonal to the direction of polarization of the polarized light transmitted by the second polarizer Po2. The direction of polarization of the polarized light transmitted by the second polarizer Po2 is the same as the direction of polarization of the polarized light transmitted by the third polarizer Po3. The direction of polarization of the polarized light transmitted by the third polarizer Po3 is orthogonal to the direction of polarization of the polarized light transmitted by the fourth polarizer Po4. The diffusion layer Po5 diffuses incident light and emits the diffused light. Since the directions of polarization of the light polarized by the second polarizer Po2 and the third polarizer Po3 are the same, either one of them may be removed. In that case, the transmittance can be expected to be improved. When both the second polarizer Po2 and the third polarizer Po3 are provided, contrast can be improved compared with the case where only one of them is provided. If either one of the second polarizer Po2 or the third polarizer Po3 is removed, it is preferred to omit the second polarizer Po2 is preferably omitted from the point of view of an expected effect of improving the contrast by the third polarizer Po3 that limits the direction of polarization of the light diffused by the diffusion layer Po5.

Figure 3:
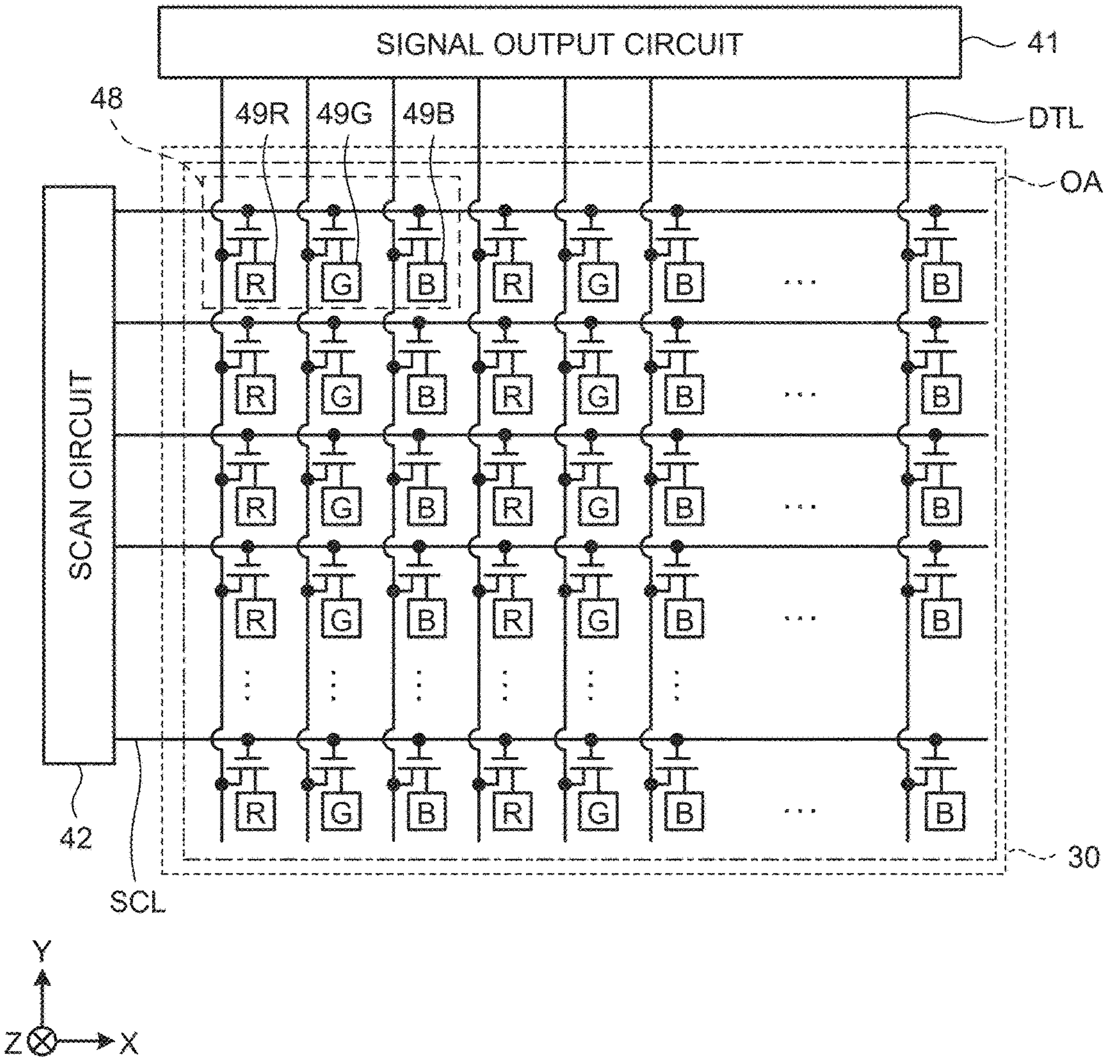
FIG. 3 is a view illustrating an exemplary pixel array of the display panel.

FIG. 3 is a view illustrating an exemplary pixel array of the display panel 30. As illustrated in FIG. 3, each of the pixels 48 includes, for example, a first sub-pixel 49R, a second sub-pixel 49G, and a third sub-pixel 49B. The first sub-pixel 49R displays a first primary color (for example, red). The second sub-pixel 49G displays a second primary color (for example, green). The third sub-pixel 49B displays a third primary color (for example, blue). In this manner, each of the pixels 48 arranged in a matrix having a row-column configuration on the display panel 30 includes the first sub-pixel 49R for displaying a first color, the second sub-pixel 49G for displaying a second color, and the third sub-pixel 49B for displaying a third color. The first color, the second color, and the third color are not limited to the first primary color, the second primary color, and the third primary color, but only need to be different colors from one another, such as complementary colors. In the following description, the first sub-pixel 49R, the second sub-pixel 49G, and the third sub-pixel 49B will be each called a sub-pixel 49 when they need not be distinguished from one another.

The pixel 48 may further include a sub-pixel 49 in addition to the first sub-pixel 49R, the second sub-pixel 49G, and the third sub-pixel 49B. For example, the pixel 48 may include a fourth sub-pixel for displaying a fourth color. The fourth sub-pixel displays a fourth color (for example, white). The fourth sub-pixel is preferably brighter than the first sub-pixel 49R for displaying the first color, the second sub-pixel 49G for displaying the second color, and the third sub-pixel 49B for displaying the third color, when they are irradiated with the same light source lighting amount.

The display device 1 is more specifically a transmissive color liquid crystal display device. As illustrated in FIG. 3, the display panel 30 is a color liquid crystal display panel, in which a first color filter for transmitting the first primary color is disposed between the first sub-pixel 49R and an image viewer, a second color filter for transmitting the second primary color is disposed between the second sub-pixel 49G and the image viewer, and a third color filter for transmitting the third primary color is disposed between the third sub-pixel 49B and the image viewer. The first color filter, the second color filter, and the third color filter are components included in a filter film 26 to be described later.

When the fourth sub-pixel is provided, no color filter is disposed between the fourth sub-pixel and the image viewer. In this case, a large level difference in height is generated at the fourth sub-pixel. Therefore, a transparent resin layer instead of the color filter may be provided on the fourth sub-pixel. This configuration can restrain the generation of the large level difference in height at the fourth sub-pixel.

The signal output circuit 41 is electrically coupled to the display panel 30 through signal lines DTL. The display panel driver 40 causes the scan circuit 42 to select the sub-pixel 49 on the display panel 30 and control ON and OFF of a switching element (such as a thin-film transistor (TFT)) for controlling operation (light transmittance) of the sub-pixel 49. The scan circuit 42 is electrically coupled to the display panel 30 through scan lines SCL.

In the embodiment, the signal lines DTL are arranged in the X-direction. Each of the signal lines DTL extends in the Y-direction. The scan lines SCL are arranged in the Y-direction. Each of the scan lines SCL extends in the X-direction. Thus, in the embodiment, in response to the drive signal output from the scan circuit 42, the pixels 48 are driven for each pixel row (line) including a plurality of the pixels 48 that are arranged in the X-direction so as to share the scan line SCL. Hereinafter, a simple notation of "line" refers to a pixel row including the pixels 48 that are arranged in the X-direction so as to share the scan line SCL.

The term "horizontal scan direction" refers to a direction along the extending direction of each of the scan lines SCL. The term "vertical scan direction" refers to the arrangement direction of the scan lines SCL. In the embodiment, the X-direction corresponds to the horizontal scan direction, and the Y-direction corresponds to the vertical scan direction.

Figure 4:
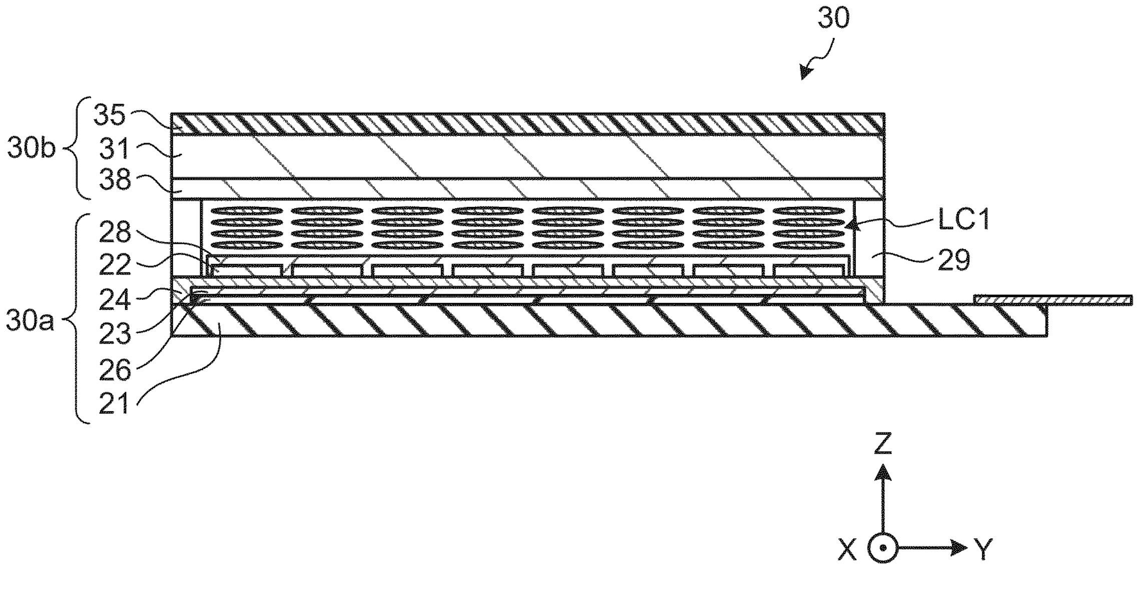
FIG. 4 is a sectional view illustrating an exemplary schematic sectional structure of the display panel.

FIG. 4 is a sectional view illustrating an exemplary schematic sectional structure of the display panel 30. An array substrate 30*a* includes the filter film 26 provided on the upper side of a pixel substrate 21 such as a glass substrate, a counter electrode 23 provided on the upper side of the filter film 26, an insulating film 24 provided on the upper side of the counter electrode 23 so as to be in contact therewith, pixel electrodes 22 on the upper side of the insulating film 24, and a first orientation film 28 provided on the uppermost surface side of the array substrate 30*a*. A counter substrate 30*b* includes a counter pixel substrate 31 such as a glass substrate, a second orientation film 38 provided on the lower surface of the counter pixel substrate 31, and a polarizing plate 35 provided on the upper surface thereof. The array substrate 30*a* is fixed to the counter substrate 30*b* with a sealing part 29 interposed therebetween. A liquid crystal layer LC1 is sealed in a space surrounded by the array substrate 30*a*, the counter substrate 30*b*, and the sealing part 29. The liquid crystal layer LC1 contains liquid crystal molecules that change in orientation direction depending on an electric field applied thereto. The liquid crystal layer LC1 modulates light transmitted in the liquid crystal layer LC1 depending on the state of the electric field. The electric field applied between the pixel electrodes 22 and the counter electrode 23 changes the orientations of the liquid crystal molecules of the liquid crystal layer LC1, and thus changes the transmission amount of the light passing through the display panel 30. The sub-pixels 49 include the respective pixel electrodes 22. The switching elements for individually controlling the operation (light transmittance) of the sub-pixels 49 are electrically coupled to the pixel electrodes 22.

The dimmer 70 includes the dimming panel 80 and the dimming panel driver 140. The dimming panel 80 of the embodiment has the same configuration as that of the display panel 30 illustrated in FIG. 4 except that the filter film 26 is not included. Thus, the dimming panel 80 includes dimming pixels 148 not provided with the color filters (refer to FIG. 1) instead of the pixels 48 including the first sub-pixels 49R, the second sub-pixels 49G, and the third sub-pixels 49B distinguished by the colors of the color filters (refer to FIG. 3). That is, the dimming panel 80 is a monochrome liquid crystal panel. A signal output circuit 141 and a scan circuit 142 included in the dimming panel driver 140 have the same configurations as those of the signal output circuit and the scan circuit of the display panel driver 40 except that the signal output circuit 141 and the scan circuit 142 are coupled to the dimming panel 80. Signal lines ADTL between the dimming panel 80 and the dimming panel driver 140 illustrated in FIG. 1 have the same configuration as that of the signal lines DTL described with reference to FIG. 3. Scan lines ASCL between the dimming panel 80 and the dimming panel driver 140 illustrated in FIG. 1 have the same configuration as that of the scan lines SCL described with reference to FIG. 3. In the dimming panel 80 of the present embodiment, one or more of the dimming pixels 148 are controlled as one light control unit. For example, the size of the region controlled as one light control unit on the dimming panel 80 includes a plurality of the pixels 48 when viewed from the front point of view. In the description of the embodiment, the width in the X-direction controlled as one light control unit corresponds to the width of one of the pixels 48 arranged in the X-direction. In other words, the width in the X-direction controlled as one light control unit corresponds to the width of the three sub-pixels 49 arranged in the X-direction. The width in the Y-direction controlled as one light control unit corresponds to the width of one pixel 48 arranged in the Y-direction. The number of the pixels 48 in the region controlled as one light control unit exemplified herein is only an example, being not limited to this number, but changeable as appropriate. For example, h1×v1 pixels 48 (h1 pixels in the X-direction and v1 pixels in the Y-direction) may be arranged in the region controlled as one light control unit. h1 and v1 are any natural numbers.

In the dimming panel 80, one pixel electrode 22 or a plurality of the pixel electrodes 22 may be provided for the region controlled as one light control unit. When a plurality of the pixel electrodes 22 are provided in the region controlled as one light control unit, the pixel electrodes 22 are controlled to have the same potential. This control allows the pixel electrodes 22 to behave substantially in the same manner as one single pixel electrode 22.

In the embodiment, the arrangement of the pixels 48 in the display area OA is the same as the arrangement of the dimming pixels 148 in the dimming area DA. Consequently, in the embodiment, the number of the pixels 48 arranged in the X-direction of the display area OA is the same as the number of the dimming pixels 148 arranged in the X-direction of the dimming area DA. In the embodiment, the number of the pixels 48 arranged in the Y-direction of the display area OA is the same as the number of the dimming pixels 148 arranged in the Y-direction of the dimming area DA. In the embodiment, the display area OA overlaps the dimming area DA when viewed from the front point of view. The Z-direction corresponds to an optical axis LL of the light emitted from the light-emitting area LA of the light source device 50. Thus, an optical axis (optical axis LL) of light passing through one of the pixels 48 coincides with an optical axis of light passing through one dimming pixel 148 located at a position overlapping with the one pixel 48 when viewed from the front point of view. However, the light emitted from the light-emitting area LA is radially diffused incoherent light. Therefore, light rays in directions not along the optical axis LL may also enter the dimming pixels 148 and the pixels 48.

The light emitted from the light source device 50 enters the dimming panel 80 through the first polarizer Po1. Light that has entered the dimming panel 80 and passed through the dimming pixels 148 enters the display panel 30 through the second polarizer Po2, the diffusion layer Po5, and the third polarizer Po3. Light that has entered the display panel 30 and passed through the pixels 48 is output through the fourth polarizer Po4. Based on the thus output light, the user of the display device 1 views the image output from the display device 1. The user is a person, such as a user illustrated in, for example, FIG. 10 to be explained later, who views the image output by the display device 1.

If the case is limited to viewing the image from the front side of the panel plane (XY-plane) of the display device 1, the user of the display device 1 is considered to be able to view the image output by the display device 1 without any problem if the dimming pixels 148 capable of transmitting light having an optical axis that coincides with the optical axis LL passing through a pixel 48 controlled to transmit light for displaying the image on the display panel 30 are controlled to transmit the light.

In this case, the dimming pixel 148 corresponding to a pixel 48 controlled not to transmit light for displaying the image on the display panel 30 (i.e., the dimming pixel 148 capable of passing light having an optical axis that coincides with an optical axis passing through the pixel 48 controlled not to transmit light), is controlled not to transmit the light. However, the user of the display device 1 does not always view an image from the front side of the panel plane (XY-plane) of the display device 1. If the pixels 48 and the dimming pixels 148 are controlled in the same manner as in the case of viewing the image from the front side of the panel plane (XY-plane) of the display device 1 described above, the user viewing the fourth polarizer Po4 side of the display device 1 in a direction having an angle (oblique viewing angle) that intersects the panel plane and the Z-direction may view a double image and/or a chipped image.

Figure 5:
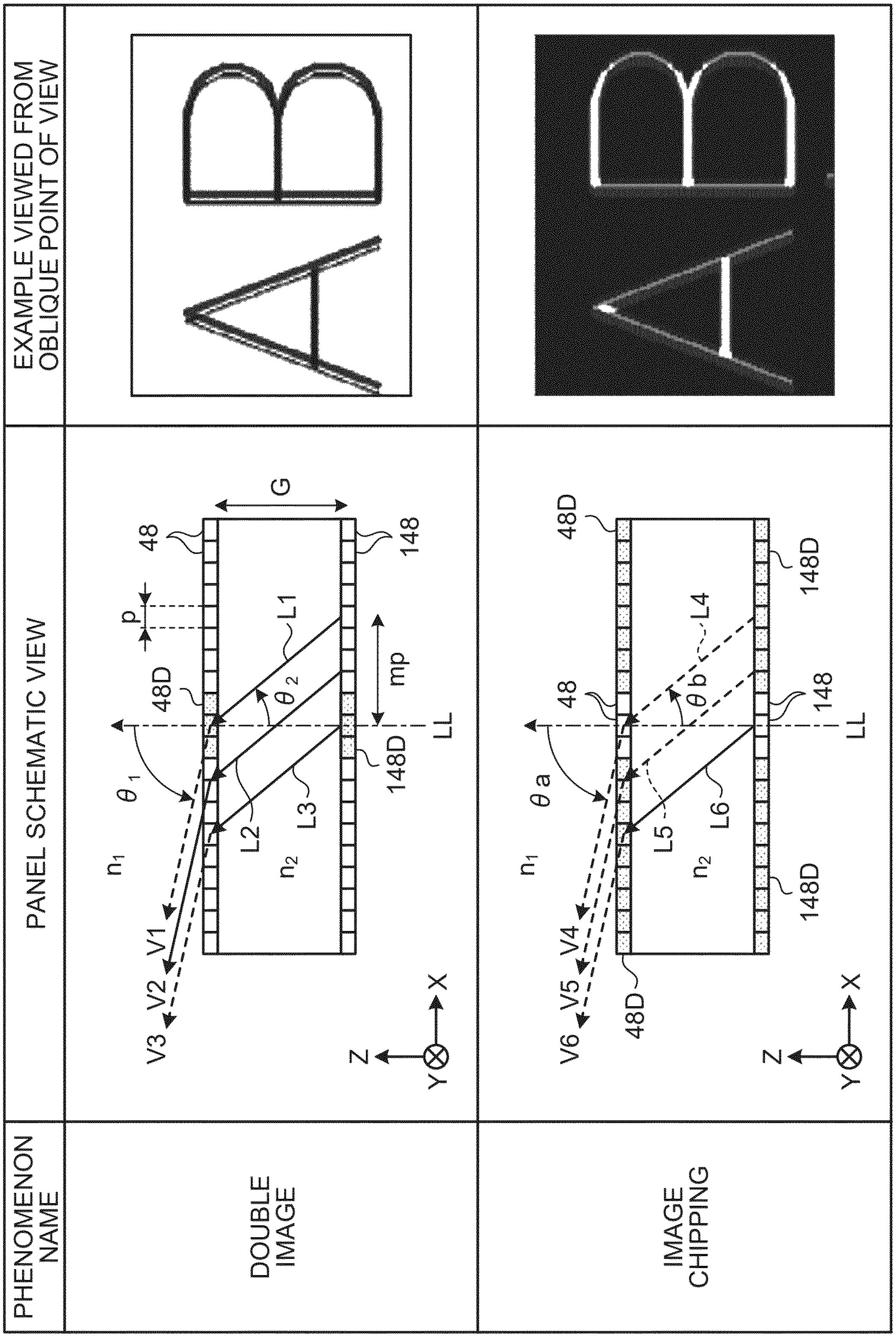
FIG. 5 illustrates views illustrating principles and examples of generation of a double image and image chipping.

FIG. 5 illustrates views illustrating principles and examples of generation of the double image and the image chipping. In FIG. 5, the column of "PANEL SCHEMATIC VIEW" indicates schematic sectional views of the display device 1. In each of the schematic sectional views, white rectangles represent the pixels 48 and the dimming pixels 148 in which the orientations of the liquid crystals are controlled to transmit light. In each of the schematic sectional views, a set of the pixels 48 in which the orientations of the liquid crystals are controlled not to transmit light is represented by dot-patterned rectangles as a light-blocking portion 48D. In each of the schematic sectional views, a set of the dimming pixels 148 in which the orientations of the liquid crystals are controlled not to transmit light is represented by dot-patterned rectangles as a light-blocking portion 148D.

Light that has passed through the dimming pixels 148, passed through the multilayered structure (the second polarizer Po2, the diffusion layer Po5, and the third polarizer Po3) between the dimming pixels 148 and the pixels 48, and then passed through the pixels 48 is emitted from the light-emitting surface side of the display panel 30 through the fourth polarizer Po4 (refer to FIG. 2) not illustrated in FIG. 5. When the light is emitted from the light-emitting surface side of the display panel 30, the light is refracted by a difference in refractive index between the multilayered structure and air on the light-emitting surface side of the display panel 30. In FIG. 5, the refraction is illustrated by the difference between a travel angle θb of the light in the display device 1 and an emission angle θa of the light outside the light-emitting surface of the display device 1 due to a difference between a refractive index $n_2$ of the multilayered structure and a refractive index $n_1$ of the air.

More specifically, Expression (1) below is satisfied. When G denotes the interval in the Z-direction between the pixels 48 and the dimming pixels 148, Expression (2) below is satisfied. p in Expression (2) denotes the width of the pixel 48 in the X-direction. m denotes a numerical value indicating the number of the pixels 48 obtained by converting the positional misalignment in the X-direction between the point of light emission on the dimming pixel 148 side and the point of light incidence on the pixel 48 side caused by the travel angle θb of the light in the display device 1 into the number of the pixels 48. The refractive index ($n_1$) of air is 1.0, and the refractive index ($n_2$) of the multilayered structure (the second polarizer Po2, the diffusion layer Po5, and the third polarizer Po3) is a value different from 1.0. Expression (3) is established based on Expressions (1) and (2). Thus, a blurring region mp centered on the optical axis LL and corresponding to θa can be calculated from $n_1$, $n_2$, and θa based on Expression (3). The dimming pixels 148 included in the blurring region mp are controlled to transmit the light. G is the interval between, for example, the middle position in the Z-direction of the pixel 48 and the middle position in the Z-direction of the dimming pixel 148. The middle position in the Z-direction of the pixel 48 is the middle position in the Z-direction of the display panel 30. The middle position in the Z-direction of the dimming pixel 148 is the middle position in the Z-direction of the dimming panel 80. G can also be regarded as the distance of the liquid crystal layer LC1 between the display panel 30 and the dimming panel 80. Hereafter, the term “gap G” refers to G described in this paragraph.

$$n_1 \sin\theta a = n_2 \sin\theta b \tag{1}$$

$$G\tan\theta b = \mathrm{mp} \tag{2}$$

$$\mathrm{mp} = G\tan\{\sin^{-1}(n_1 \sin\theta a / n_2)\} \tag{3}$$

If the light is not blocked by the light-blocking portion 48D due to the refraction described above as illustrated in the column of “PANEL SCHEMATIC VIEW” of the row of “DOUBLE IMAGE”, light L1 transmitted through the dimming pixel 148 is emitted as light V1. In reality, the light V1 is not emitted because the light is blocked by the light-blocking portion 48D. Light L2 transmitted through the dimming pixel 148 is output as light V2. If the light is not blocked by the light-blocking portion 148D, the light transmitted along the axis of travel of light L3 is emitted as light V3 as indicated by a dashed line.

When the light-emitting surface of the display device 1 in the state illustrated in the column of “PANEL SCHEMATIC VIEW” of the row of “DOUBLE IMAGE” is viewed from the front side, both sides in the X-direction with the light-blocking portion 48D interposed therebetween should be lit. That is, one non-light-emitting (black) region is present when viewed from the front point of view. In contrast, when the light-emitting surface of the display device 1 is viewed at an oblique angle that forms an emission angle $\theta_1$ with respect to the XY-plane and the X-direction, optical axes of the light L1 and L3 that are not actually produced are located with the light V2 interposed therebetween. That is, two non-light-emitting (black) regions arranged in the X-direction with the light V2 interposed therebetween are produced. Thus, an image formed in one non-light-emitting (black) region when viewed from the front point of view may be viewed as the double image formed in two non-light-emitting (black) regions when viewed at an oblique angle. FIG. 5 illustrates an example of occurrence of such a double image in the column of “EXAMPLE VIEWED FROM OBLIQUE POINT OF VIEW” of the row of “DOUBLE IMAGE”.

If the light is not blocked by the light-blocking portion 148D as illustrated in the column of “PANEL SCHEMATIC VIEW” of the row of “IMAGE CHIPPING”, light L4 is emitted as light V4. In reality, the light V4 is not emitted because the light is blocked by the light-blocking portion 148D. If the light is not blocked by the light-blocking portion 148D, light L5 is emitted as light V5. In reality, the light V5 is not emitted because the light is blocked by the light-blocking portion 148D. Even if the light is not blocked by the light-blocking portion 148D, the light V5 is not emitted because the light is blocked by the light-blocking portion 48D. If the light is not blocked by the light-blocking portion 48D, light L6 transmitted through the dimming pixel 148 is emitted as light V6. In reality, the light V6 is not emitted because the light is blocked by the light-blocking portion 48D.

In the state illustrated in the column of “PANEL SCHEMATIC VIEW” of the row of “IMAGE CHIPPING”, the light-blocking portion 48D is produced so as to interpose therein the pixels 48 that can transmit light. Therefore, one light-emitting region interposed between non-light-emitting (black) regions should be visible from the front point of view. In contrast, when the light-emitting surface of the display device 1 is viewed at an oblique angle that forms the emission angle θa with respect to the XY-plane and the X-direction, the light-emitting region is not visible. This is because none of the light rays V4, V5, and V6 is emitted, as described above. Thus, an image formed in one light-emitting region when viewed from the front point of view may be invisible at an oblique angle. The chipped image that appears when the display device 1 is viewed at an oblique angle is produced by this mechanism. FIG. 5 illustrates an example of occurrence of such a chipped image in the column of “EXAMPLE VIEWED FROM OBLIQUE POINT OF VIEW” of the row of “IMAGE CHIPPING”. In FIG. 5, each light control unit is illustrated as one dimming pixel 148; however, in reality, each light control unit may include one or more dimming pixels 148. The width in the X-direction of the dimming pixel 148 schematically illustrated in FIG. 5 is set to be the same as that of the pixel 48 in order to facilitate the understanding of the positional correspondence with the pixel 48, but, in reality, more than one pixel 48 may be included in one light control unit, as described above. In the following description, one light control unit corresponds to one dimming pixel 148.

In view of the problem described above, in the embodiment, a blurring process is applied in the control of the region in which the dimming panel 80 transmits light. The term “blurring process” refers to a process of controlling the dimming pixels 148 so that the dimming panel 80 transmits light over a wider region than a region of light transmission that is provided when the input signal IP is accurately reflected. Thus, the region in which light is transmittable through the dimming panel 80 to which the blurring process is applied is wider than a region in which light is transmittable through the display panel 30. The following describes the blurring process with reference to FIG. 6.

Figure 6:
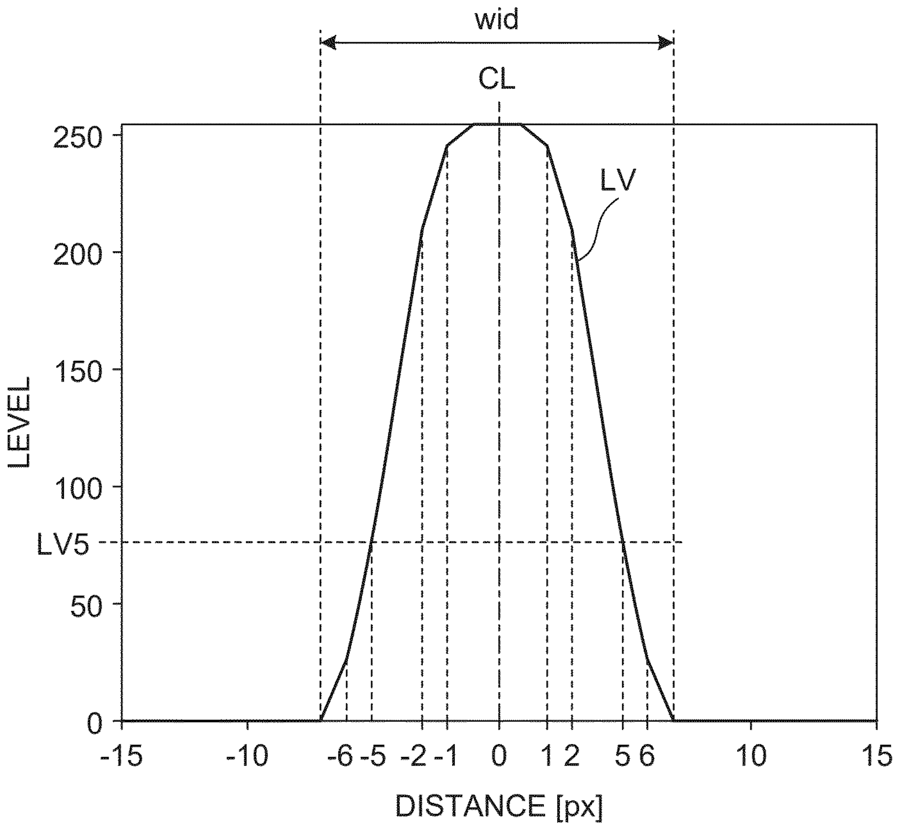
FIG. 6 is a graph illustrating an exemplary relation between a distance from a dimming pixel regarded as being located at center coordinates of a center position determined based on coordinates of a pixel controlled to transmit light at the highest gradation and a degree (level) to which light is controlled to be transmitted by a blurring process.

FIG. 6 is a graph illustrating an exemplary relation between the distance from the dimming pixel 148 regarded as being located at a center CL determined based on coordinates of the pixel 48 controlled to transmit light at the highest gradation and the degree (level) to which light is controlled to be transmitted by the blurring process. In the graph in FIG. 6, the horizontal axis represents the distance and the vertical axis represents the degree to which light is transmitted. As to the distance, the dimming pixel 148 located at the center CL determined by a blurring cancel determiner 13 (to be described later) based on the coordinates of the pixel 48 controlled to transmit light at the highest gradation is assumed to be located in a position at a distance of “0”. The dimming pixel 148 adjacent to the dimming pixel 148 at the distance of “0” is assumed to be located at a distance of “1” from the dimming pixel 148 at the distance of “0”. The other dimming pixels 148 are assumed to be arranged in the X-direction or the Y-direction at distances obtained by adding 1 to the number of the intervening dimming pixels 148 with respect to the dimming pixel at the distance of “0”. FIG. 6 illustrates an example in which the light transmission degree is expressed with a gradation of 8 bits (256 gradations). However, this is merely an example, and can be changed as appropriate.

As illustrated in FIG. 6, in the embodiment, not only the dimming pixel 148 at the distance of “0” but also the dimming pixels 148 at the distance of “1” to “6” are controlled to transmit light by the blurring process. The dimming pixel 148 at the distance of “1” is controlled to transmit light to the same degree as that of the dimming pixel 148 at the distance of “0”. The dimming pixel 148 at a distance of “2” or larger is controlled to transmit light so that the degree of light transmission decreases as the distance increases. Thus, the blurring process is applied to the dimming pixels 148 included in a blurring region wid centered on the dimming pixel 148 at the distance of “0”.

The specific range of the distance from the dimming pixel 148 at the distance of “0”, which defines the blurring region wid to be controlled to transmit light by the blurring process, is appropriately set. More specifically, based on data such as the region of the distance from the dimming pixel 148 at the distance of “0” to which the blurring process is applied is set based on dimension data including, for example, an allowable range of the angle (ea) at which the oblique point of view with respect to the display device 1 is established, the size of the gap G, and the like.

Figure 7:
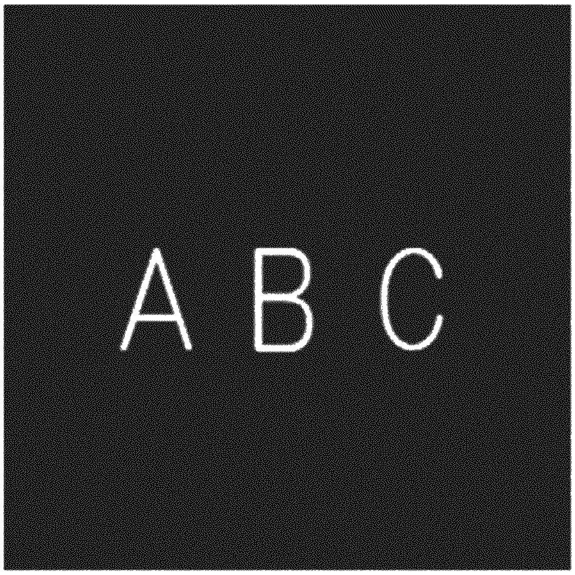
FIG. 7 is a view illustrating an example of display output by an input signal to the display device.
Figure 8:
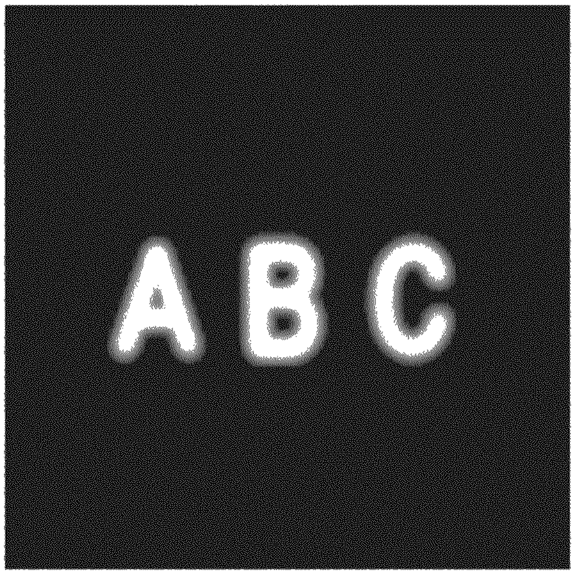
FIG. 8 is a view illustrating a region of light transmission by the dimming panel to which the blurring process is applied based on the display output illustrated in FIG. 7.

FIG. 7 is a view illustrating an example of display output by the input signal IP to the display device 1. FIG. 8 is a view illustrating the region of light transmission by the dimming panel 80 to which the blurring process is applied based on the display output illustrated in FIG. 7. In FIGS. 7 and 8, regions controlled to transmit light are illustrated in white, and regions controlled not to transmit light are illustrated as in black. As illustrated in the contrast between FIGS. 7 and 8, the dimming panel 80 to which the blurring process is applied controls the dimming pixels 148 so as to transmit light over a wider region than that of the display output. Specifically, the light transmission degree by the dimming pixels 148 is controlled so as to widen the region transmitting light outward by thickening the edge lines of the regions transmitting light in the display output image illustrated in FIG. 7.

In the embodiment, a condition is given for the application of the blurring process at screen edges, that is, outer edges (for example, an outer edge Ed) of the display area OA and the vicinities thereof. The following describes the condition while comparing a comparative example with the embodiment. The screen edges and the vicinities thereof refer to, for example, both edges in the X-direction and the vicinities thereof and both edges in the Y-direction and the vicinities thereof of the display area OA illustrated in FIG. 3.

Figure 9:
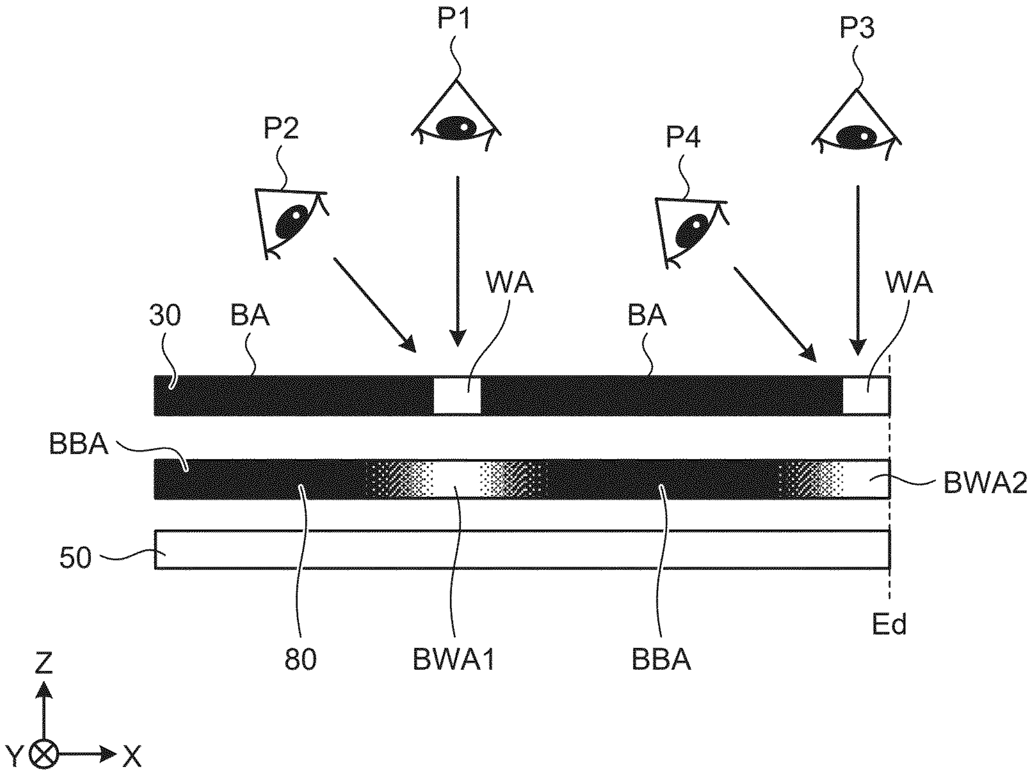
FIG. 9 is a schematic view illustrating an operation of the display device in a comparative example in which the blurring process is unconditionally applied.

FIG. 9 is a schematic view illustrating an operation of the display device in the comparative example in which the blurring process is unconditionally applied. As illustrated in FIG. 9, the dimming panel 80 is interposed between the display panel 30 and the light source device 50, and limits the region in which light from the light source device 50 reaches the display panel 30 to regions in which light is required in image output by the display panel 30. In FIG. 9, the regions in which the pixels 48 that require light in the image output by the display panel 30 are arranged are illustrated as high-luminance regions WA. The regions in which the pixels 48 that do not require light in the image output by the display panel 30 are arranged are illustrated as low-luminance regions BA. The “low-luminance” of the low-luminance regions BA and the “high-luminance” of the high-luminance regions WA are expressions based on a relative comparison between the luminance of the low-luminance regions BA and the luminance of the high-luminance regions WA. Each of the low-luminance regions BA is viewed as a black region by the user viewing the display area OA. Each of the high-luminance regions WA is viewed as a region in a color other than black (for example, white) by the user viewing the display area OA.

Among the dimming pixels 148 of the dimming panel 80, the dimming pixels 148 that are included in a region located between the low-luminance region BA and the light source device 50 and included in a region except an “area located between a surrounding area of the high-luminance region WA and the light source device 50” are controlled to have the lowest degree of light transmission. The “area located between the surrounding area of the high-luminance region WA and the light source device 50” herein refers to a region to which the blurring process is applied. Among the dimming pixels 148 of the dimming panel 80, the dimming pixels 148 that are included in an area located between the high-luminance region WA and the light source device 50 are controlled to have a degree of light transmission exceeding the lowest degree. In addition, by applying the blurring process, the dimming pixels 148 included in the “area located between the surrounding area of the high-luminance region WA and the light source device 50” are also controlled to have a degree of light transmission exceeding the lowest degree. The dimming pixels 148 that are included in the region located between the high-luminance region WA and the light source device 50 are controlled to have a higher degree of light transmission than that of the dimming pixels 148 included in the “area located between the surrounding area of the high-luminance region WA and the light source device 50”. Among the dimming pixels 148 included in the “area located between the surrounding area of the high-luminance region WA and the light source device 50”, the dimming pixels 148 located closer to the high-luminance region WA in the front point of view are controlled to have a higher degree of light transmission.

FIG. 9 illustrates the high-luminance region WA located at the outer edge Ed and the high-luminance region WA located away from the outer edge Ed and the vicinity thereof. A region including the dimming pixels 148 that are controlled to have the lowest degree of light transmission in the dimming panel 80 is illustrated as a dark region BBA. Regions including the dimming pixels 148 that are controlled to have a degree of light transmission exceeding the lowest degree in the dimming panel 80 are illustrated as blurring regions BWA1 and BWA2. The blurring region BWA1 is located between the high-luminance region WA at a location away from the outer edge Ed and the vicinity thereof and the light source device 50. The blurring region BWA2 is located between the high-luminance region WA located at the outer edge Ed and the light source device 50. The blurring regions BWA1 and BWA2 include the dimming pixels 148 that are controlled to have a degree of light transmission exceeding the lowest degree by undergoing the blurring process.

Figure 10:
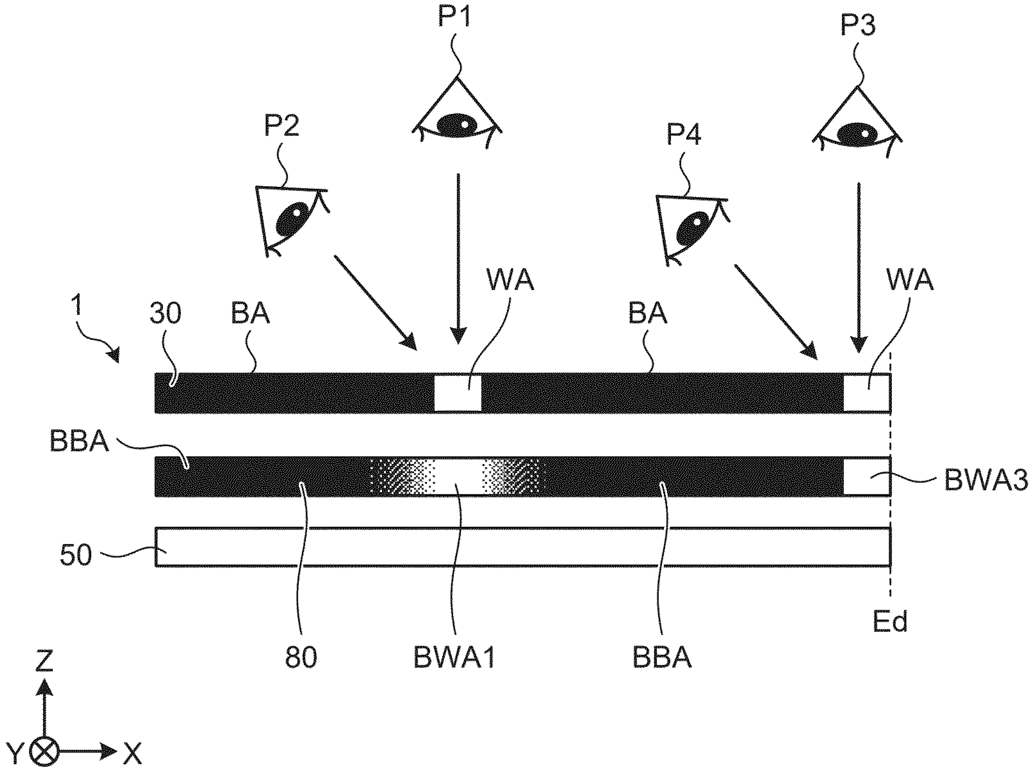
FIG. 10 is a schematic view illustrating an operation example of the display device in the embodiment.

FIG. 10 is a schematic view illustrating an operation example of the display device 1 in the embodiment. In the embodiment, the blurring region BWA2 in the comparative example described with reference to FIG. 9 is replaced with a non-blurring region BWA3. The blurring region BWA2 includes the dimming pixels 148 that are included in the "area located between the surrounding area of the high-luminance region WA and the light source device 50" and that are controlled to have a degree of light transmission exceeding the lowest degree by undergoing the blurring process. In contrast, the non-blurring region BWA3 does not include the dimming pixels 148 that are included in the "area located between the surrounding area of the high-luminance region WA and the light source device 50" and that are controlled to have a degree of light transmission exceeding the lowest degree by undergoing the blurring process. Thus, in the embodiment, the blurring process may not be applied in the control of the dimming pixels 148 that are controlled to transmit light corresponding to the high-luminance region WA located at and near the outer edge Ed. The following describes that the blurring process is not applied to the outer edge Ed and the vicinity thereof, with reference to FIG. 11.

Figure 11:
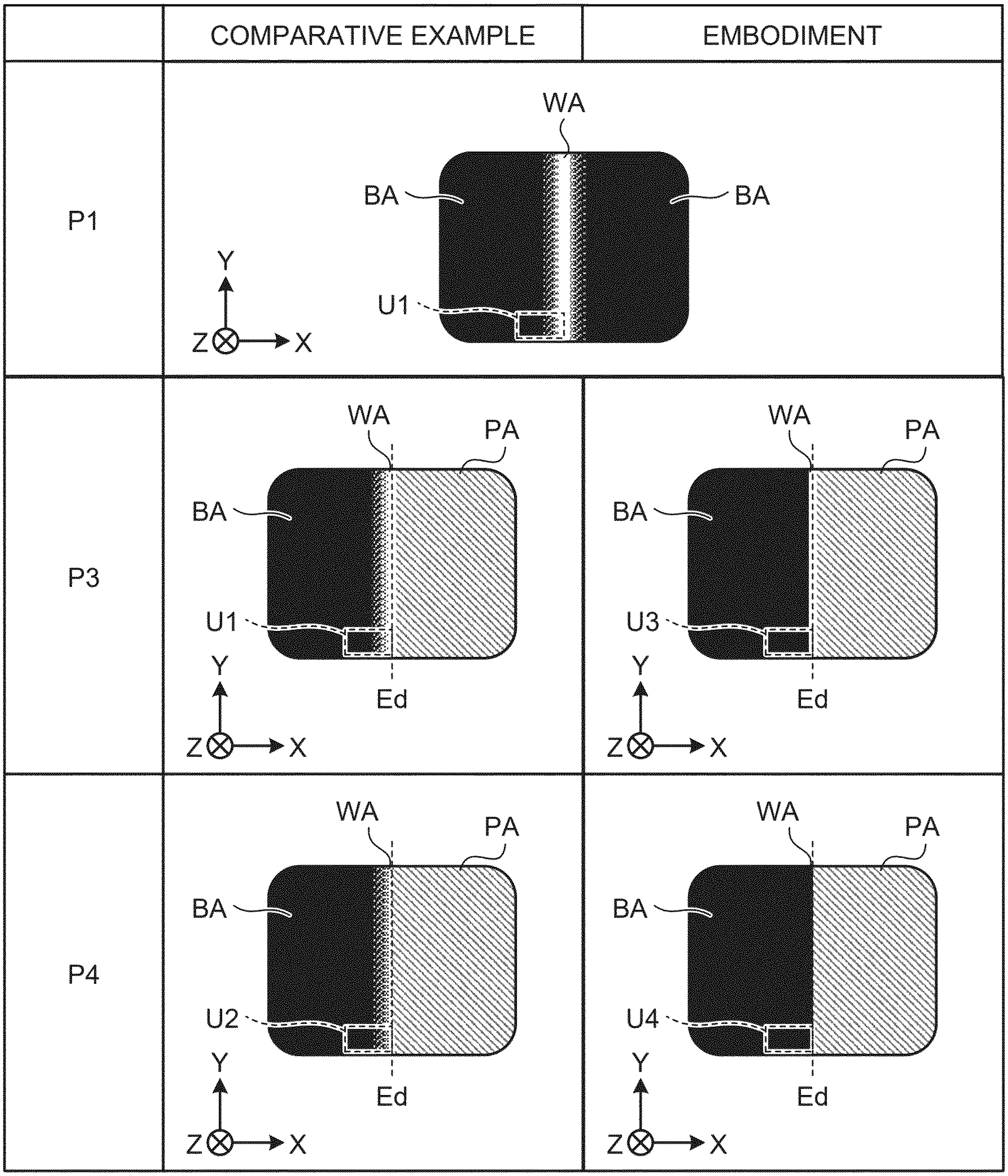
FIG. 11 illustrates schematic views illustrating images viewed when a high-luminance region and the vicinity thereof are viewed from points of view illustrated in FIGS. 9 and 10.

FIG. 11 illustrates schematic views illustrating images viewed when the high-luminance region WA and the vicinity thereof are viewed from points of view P1, P3, and P4 illustrated in FIGS. 9 and 10. FIG. 11 illustrates the schematic views assuming that the high-luminance region WA illustrated in FIGS. 9 and 10 is a linear high-luminance region extending along the Y-direction.

As illustrated in row "P1" of FIG. 11, when viewing the high-luminance region WA and the vicinity thereof located away from the outer edge Ed and the vicinity thereof from the point of view P1 illustrated in FIGS. 9 and 10, the user views the linear high-luminance region WA extending along the Y-direction and the peripheral low-luminance region BA. The point of view P1 is a point of view from which the high-luminance region WA is viewed from the front.

As illustrated in row "P3" of "COMPARATIVE EXAMPLE" in FIG. 11, when viewing the high-luminance region WA located at the outer edge Ed and the vicinity thereof from the point of view P3 illustrated in FIG. 9, the user views the high-luminance region WA extending along the Y-direction, the peripheral low-luminance region BA, and the display area OA that is located on the opposite side to the low-luminance region BA with the high-luminance region WA interposed therebetween and located outside the display device beyond the outer edge Ed. The point of view P3 is a point of view from which the high-luminance region WA is viewed from the front.

Figure 12:
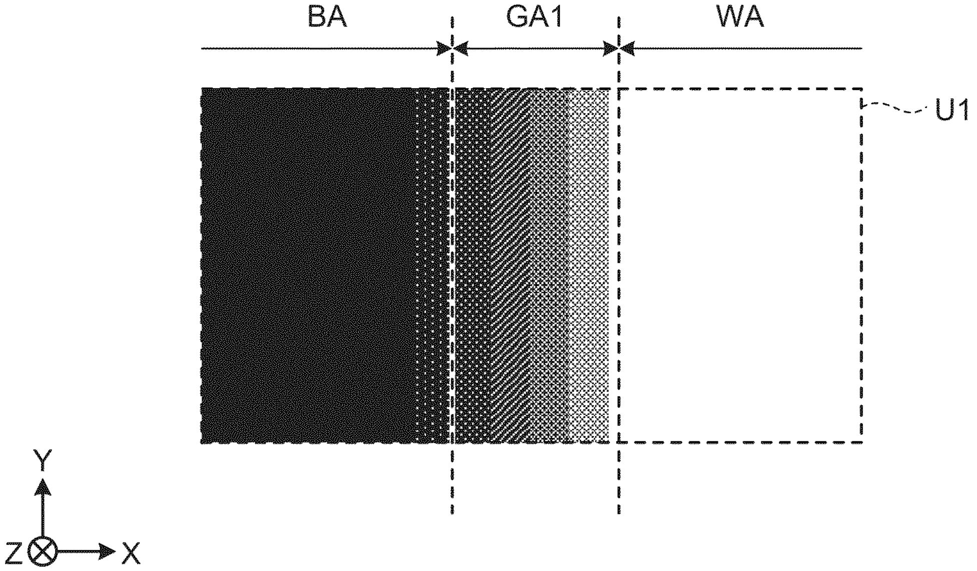
FIG. 12 is a schematic view illustrating an enlarged view of a partial region illustrated in row "P1" and row "P3" of "comparative example" in FIG. 11.

FIG. 12 is a schematic view illustrating an enlarged view of a partial region U1 illustrated in row "P1" and row "P3" of "COMPARATIVE EXAMPLE" in FIG. 11. The partial region U1 and partial regions U2, U3, and U4 to be described later are regions set for the purpose of convenience at and near the boundary between the high-luminance region WA and the low-luminance region BA in order to illustrate the boundary and the vicinity thereof in more detail. The application of the blurring process generates a region in which the luminance gradually decreases from the high-luminance region WA side toward the low-luminance region BA side, between the high-luminance region WA and the low-luminance region BA. FIG. 12 illustrates the region between the high-luminance region WA and the low-luminance region BA as a blurring region GA1.

However, the user viewing the high-luminance region WA and the vicinity thereof from the point of view P1 and the user viewing the high-luminance region WA and the vicinity thereof from the point of view P3 in the comparative example hardly recognize the blurring region GA1. The reason is as follows: since the difference in contrast between the high-luminance region WA and the low-luminance region BA is significantly noticeable, the blurring region GA1 in which the degree of change in contrast between the high-luminance region WA and the low-luminance region BA is relatively mild is less noticeable. Therefore, the generation of the blurring region GA1 between the high-luminance region WA and the low-luminance region BA substantially causes no problem as the display quality of the image that includes the high-luminance region WA and the low-luminance region BA.

Although not illustrated in FIG. 11, when the high-luminance region WA and the vicinity thereof located away from the outer edge Ed and the vicinity thereof are viewed from the point of view P2 in FIGS. 9 and 10, almost the same image as that from the point of view P1 can be viewed.

As illustrated in row "P4" of "COMPARATIVE EXAMPLE" in FIG. 11, when viewing the high-luminance region WA located at the outer edge Ed and the vicinity thereof from the point of view P4 illustrated in FIG. 9, the user views the linear high-luminance region WA extending along the Y-direction, the peripheral low-luminance region BA, and a frame area PA that is located on the opposite side to the low-luminance region BA with the high-luminance region WA interposed therebetween and located outside the display device beyond the outer edge Ed. The point of view P4 is a point of view from which the high-luminance region WA is obliquely viewed from the low-luminance region BA side toward the frame area PA side.

Figure 13:
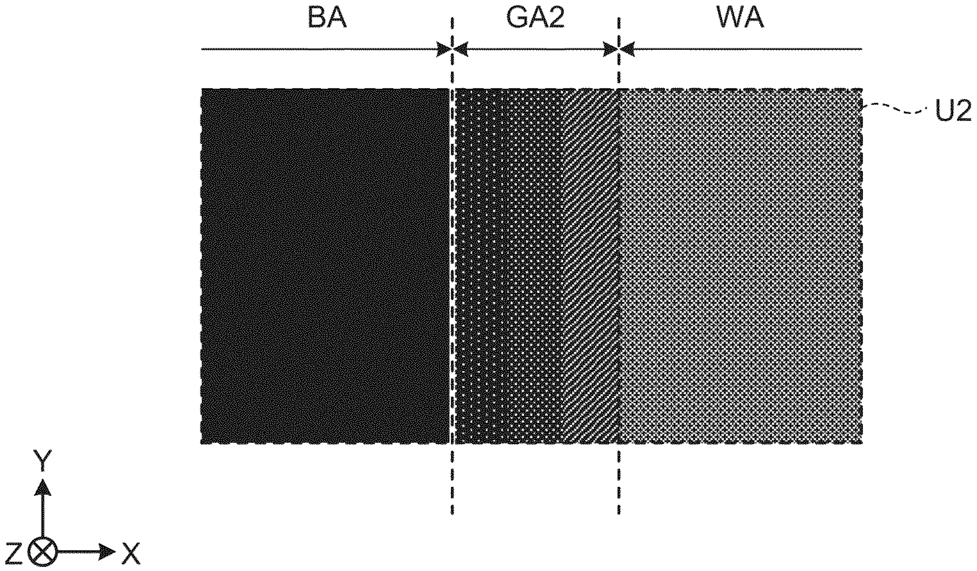
FIG. 13 is a schematic view illustrating an enlarged view of a partial region illustrated in row "P4" of "comparative example" in FIG. 11.

FIG. 13 is a schematic view illustrating an enlarged view of the partial region U2 illustrated in row "P4" of "COMPARATIVE EXAMPLE" in FIG. 11. In the comparative example, the blurring process is applied to the control of the dimming panel 80 corresponding to the high-luminance region WA located at the outer edge Ed, so that a region between the high-luminance region WA and the low-luminance region BA is generated in which the luminance gradually decreases from the high-luminance region WA side toward the low-luminance region BA side. FIG. 13 illustrates the region between the high-luminance region WA and the low-luminance region BA as a blurring region GA2. The point of view P4 is the point of view from which the high-luminance region WA is obliquely viewed from the low-luminance region BA side toward the frame area PA side. The light source device 50 does not extend to the back surface side of the high-luminance region WA when viewed from this point of view. Therefore, no oblique line of light is established that reaches the point of view P4 from the light source device 50 through the dimming panel 80 and the display panel 30. As a result, as illustrated in FIG. 13, the high-luminance region WA viewed from the point of view P4 appears to be a lower-luminance region than the high-luminance region WA viewed from any of the points of view P1, P2, and P3. This fact indicates that the difference in contrast between the high-luminance region WA and the low-luminance region BA in the partial region U2 is smaller than the difference in contrast between the high-luminance region WA and the low-luminance region BA in the partial region U1 described with reference to FIG. 12. Therefore, when viewing the high-luminance region WA located at the outer edge Ed from the point of view P4 in the comparative example, the user can recognize the blurring region GA2 generated between the high-luminance region WA and the low-luminance region BA. The blurring region GA2 is a region in which the luminance gradually decreases from the high-luminance region WA side toward the low-luminance region BA side. Thus, in the comparative example, when the image having the high-luminance region WA located at or near the outer edge Ed is output, the user viewing the image from a point of view for obliquely viewing the display device, such as the point of view P4, can view the blurring region GA2. The blurring region GA2 is generated by the application of the blurring process and does not correspond to the display output image included in the input signal IP received from the control device 2, thus being possible to be recognized as if light leakage occurs near the outer edge of the frame area PA. As the display quality of the image that includes the high-luminance region WA and the low-luminance region BA, the fact that the image is output that allows the blurring region GA2 to be recognized may not be overlooked.

Therefore, in the embodiment, the condition is set for the application of the blurring process at and near the outer edge Ed, and the blurring process is not applied if the condition is not met. This condition setting restrains the output of the image that allows the user to recognize the blurring region GA2 described with reference to FIG. 13. FIG. 10 and column "EMBODIMENT" in FIG. 11 schematically illustrate a case where the condition for applying the blurring process has not been met for the high-luminance region WA located at the outer edge Ed.

As illustrated in row "P3" of "EMBODIMENT" in FIG. 11, when viewing the high-luminance region WA located at the outer edge Ed and the vicinity thereof from the point of view P3 illustrated in FIG. 10, the user views the linear high-luminance region WA extending along the Y-direction, the peripheral low-luminance region BA, and the frame area PA that is located on the opposite side to the low-luminance region BA with the high-luminance region WA interposed therebetween and located outside the display device beyond the outer edge Ed.

Figure 14:
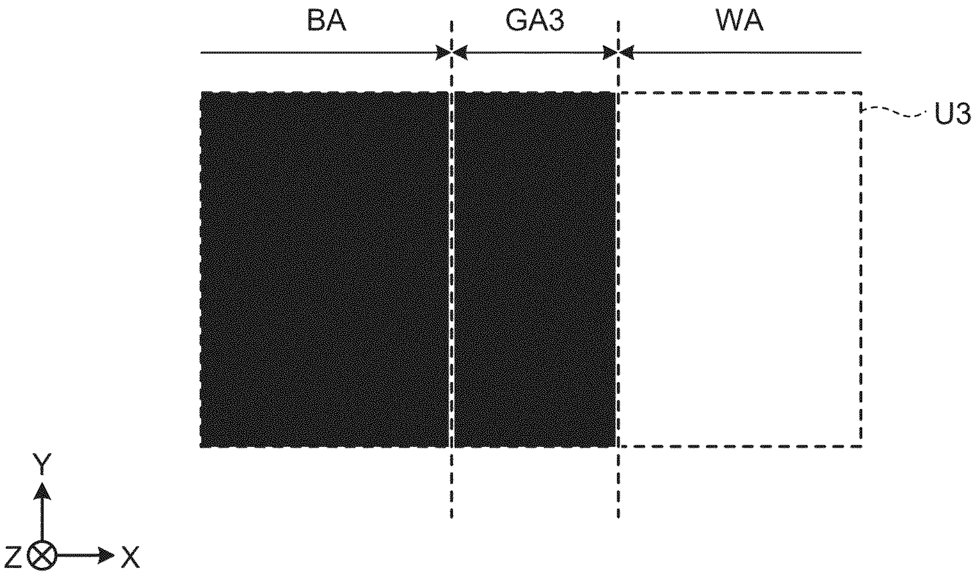
FIG. 14 is a schematic view illustrating an enlarged view of a partial region illustrated in row "P3" of "embodiment" in FIG. 11.

FIG. 14 is a schematic view illustrating an enlarged view of the partial region U3 illustrated in row "P3" of "EMBODIMENT" in FIG. 11. By not applying the blurring process, a region substantially the same as the low-luminance region BA, such as a boundary region GA3 illustrated in FIG. 14, is generated, instead of the blurring region GA1 that is generated by the application of the blurring process in the comparative example. The output of such an image is preferable as an image that can be viewed from a point of view, such as the point of view P3, from which the display device 1 is viewed from the front.

When viewing the high-luminance region WA located at the outer edge Ed and the vicinity thereof from the point of view P4 illustrated in FIG. 10, the user views the linear high-luminance region WA extending along the Y-direction, the peripheral low-luminance region BA, and the frame area PA that is located on the opposite side to the low-luminance region BA with the high-luminance region WA interposed therebetween and located outside the display device beyond the outer edge Ed, as illustrated in row "P4" of "EMBODIMENT" in FIG. 11.

Figure 15:
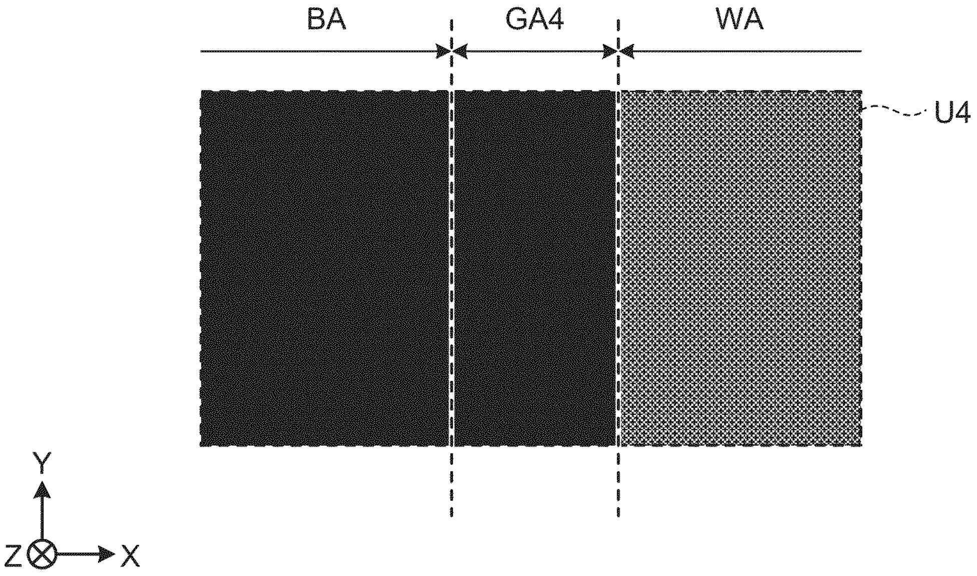
FIG. 15 is a schematic view illustrating an enlarged view of a partial region illustrated in row "P4" of "embodiment" in FIG. 11.

FIG. 15 is a schematic view illustrating an enlarged view of the partial region U4 illustrated in row "P4" of "EMBODIMENT" in FIG. 11. Even if the blurring process is not applied in the embodiment, it is the same as in the comparative example that the high-luminance region WA located at the outer edge Ed viewed from the point of view P4 appears to be a lower-luminance region than the high-luminance region WA viewed from any of the points of view P1, P2, and P3. By not applying the blurring process, a region substantially the same as the low-luminance region BA, such as a boundary region GA4 illustrated in FIG. 15, is generated, instead of the blurring region GA2 that is generated by the application of the blurring process in the comparative example. Thus, the embodiment can restrain the user from viewing a region, such as the blurring region GA2, that does not correspond to the display output image included in the input signal IP supplied from the control device 2.

Figure 16:
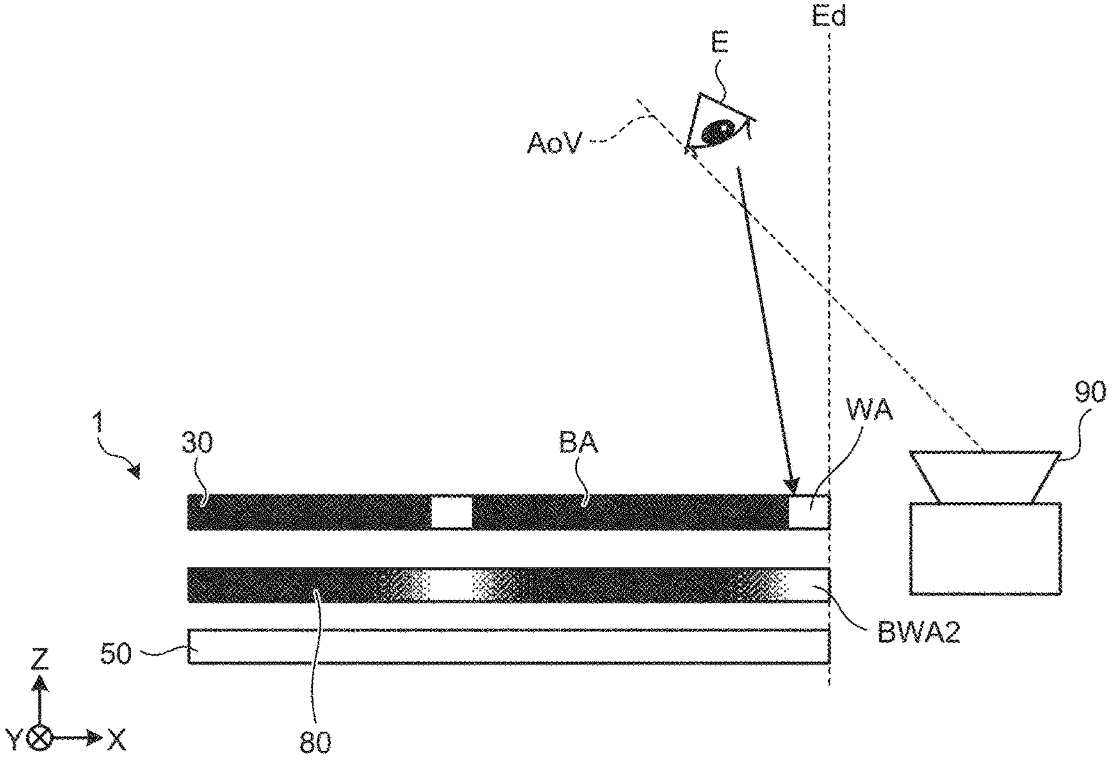
FIG. 16 is a schematic view illustrating an exemplary relation between a position of a point of view of a user and an imaging region AoV of an imaging device when the blurring process is applied to screen edges and the vicinities thereof in the embodiment.
Figure 17:
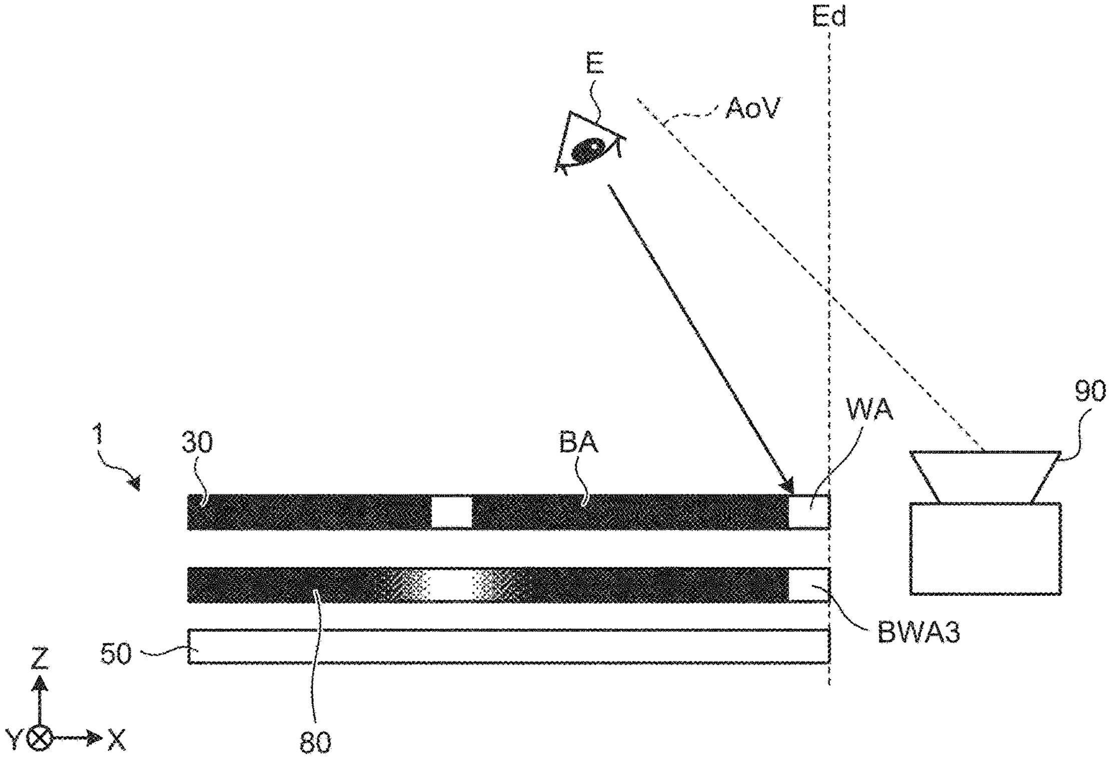
FIG. 17 is a schematic view illustrating an exemplary relation between the position of the point of view of the user and the imaging region AoV of the imaging device when the blurring process is not applied to the screen edges and the vicinities thereof in the embodiment.

The following describes the condition for applying the blurring process to the screen edges (such as the outer edge Ed described with reference to FIGS. 10 and 11) and the vicinities thereof in the embodiment, with reference to FIGS. 16 and 17.

FIG. 16 is a schematic view illustrating an exemplary relation between the position of a point of view E of the user and an imaging region AoV of the imaging device 90 when the blurring process is applied to the screen edges and the vicinities thereof in the embodiment. FIG. 17 is a schematic view illustrating an exemplary relation between the position of the point of view E of the user and the imaging region AoV of the imaging device 90 when the blurring process is not applied to the screen edges and the vicinities thereof in the embodiment.

The imaging device 90 includes an imaging element, such as a complementary metal-oxide semiconductor (CMOS) sensor, and an image generator (image generating circuit) that generates an image corresponding to an electrical signal output from the imaging element in response to light detected by the imaging element.

In each of the examples illustrated in FIGS. 16 and 17, of a region where the imaging element of the imaging device 90 detects light, that is, of a region in which the imaging device 90 captures the image, a region on the display device 1 side is indicated by a dashed line as the imaging region AoV. The imaging device 90 captures images in a region on the imaging device 90 side of the imaging region AoV. The imaging device 90 does not capture images in a region on the display device 1 side of the imaging region AoV.

The imaging device 90 illustrated in FIGS. 16 and 17 is provided so as to capture the point of view E when the point of view E is located within a region in which the outer edge Ed can be viewed substantially from the front. Therefore, when the point of view E is located within the imaging region AoV as illustrated in FIG. 16, the oblique view such as that from the point of view P4 described with reference to FIG. 10 does not occur, and the pixels 48 located at and near the outer edge Ed are viewed from a point of view substantially the same as the point of P3. In this case, the condition for applying the blurring process is met also in the embodiment. That is, in this case, the dimming pixels 148 included in the region located between the low-luminance region BA and the light source device 50, and in the region located between the surrounding area of the high-luminance region WA located at and near the outer edge Ed and the light source device 50 are controlled to have a degree of light transmission exceeding the lowest degree. Thus, in the example illustrated in FIG. 16, the blurring region BWA2 is generated between the high-luminance region WA located at the outer edge Ed and the light source device 50.

In contrast, when the point of view E is not located within the imaging region AoV as illustrated in FIG. 17, the oblique view such as that from the point of view P4 described with reference to FIG. 10 may occur. In this case, the condition for applying the blurring process is not met. Thus, in the example illustrated in FIG. 17, the non-blurring region BWA3 is generated between the high-luminance region WA located at the outer edge Ed and the light source device 50.

The arrangements of the imaging region AoV of the imaging device 90 and the imaging device 90 are not limited to the examples illustrated in FIGS. 16 and 17. The position of the imaging device 90 and the imaging region AoV only need to be set in advance so that whether the user obliquely views the high-luminance region WA located at and near the outer edge Ed can be determined based on the correspondence relation between the first information and the second information, wherein the first information indicates the position where the imaging device 90 is provided, the imaging region AoV, and the second information indicates whether the point of view E is captured, and the position of the point of view E in the imaging region AoV when the point of view E is captured.

Figure 18:
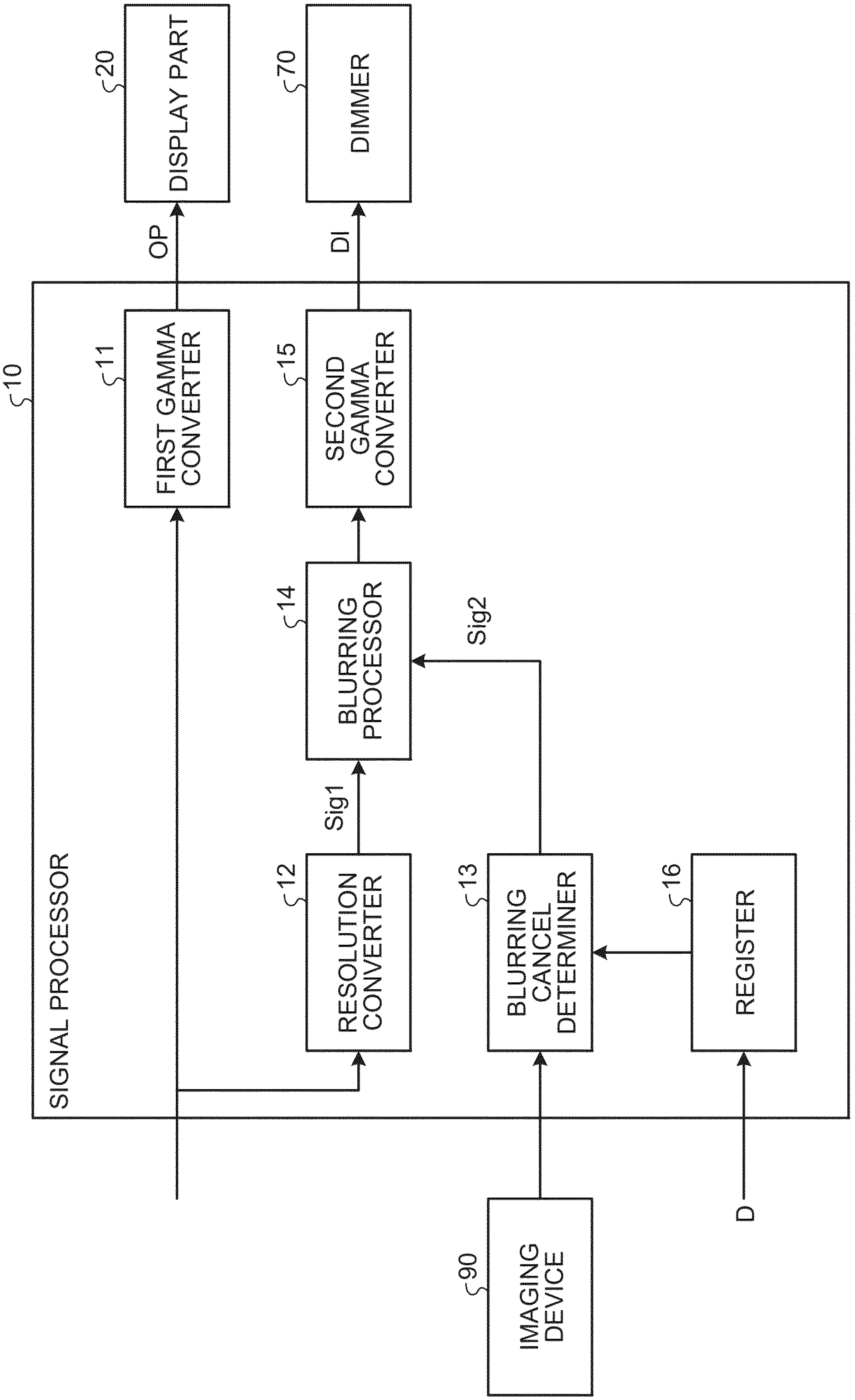
FIG. 18 is a block diagram illustrating a functional configuration example of a signal processor.

FIG. 18 is a block diagram illustrating a functional configuration example of the signal processor 10. The signal processor (signal processing circuit) 10 includes a first gamma converter 11, a resolution converter 12, the blurring cancel determiner (blurring cancel determination circuit) 13, a blurring processor (blurring processing circuit) 14, a second gamma converter 15, and a register 16. Each of the first gamma converter 11, the resolution converter 12, the blurring cancel determiner 13, the blurring processor 14, and the second gamma converter 15 illustrated in FIG. 18 may be one circuit or a part of functions performed by the configuration provided as the signal processor 10.

When gamma correction is required in obtaining output values from input values, the first gamma converter 11 performs a gamma correction process. The input values herein are RGB gradation values of each of the pixels included in the frame image represented by the input signal IP. The output values are brightness values of the pixel 48 recognized by the user viewing the display area OA when the pixel 48 included in the display panel 30 is controlled at voltages corresponding to the input values. In the embodiment, appropriate values of the output values are assumed to be obtained by controlling the pixel 48 in accordance with the input values from the viewpoint of a one-to-one relation between the RGB gradation values and each of the pixels 48, so that no particular adjustment is performed. However, depending on the gamma characteristics of the display panel 30, the first gamma converter 11 performs the gamma correction process.

In the embodiment, as described above regarding the first gamma converter 11, the RGB gradation values (input values) indicated by pixel data given to the pixel 48 in a certain position by the input signal IP corresponding to one frame image are the same as the RGB gradation values (output values) indicated by the pixel data given to the pixel 48 by the output image signal OP based on the input signal IP. Thus, when Ic denotes the input values and g0(Ic) denotes the output values, an expression Ic=g0(Ic) holds. g0(Ic) can be represented in the form of the RGB gradation values, that is, (R, G, B)=(α, β, γ). α, β, and γ are numerical values each corresponding to the number of bits of information indicating a gradation value. For example, in the case of eight bits, each of α, β, and γ can be a value within a region from 0 to 255.

The resolution converter 12 performs resolution conversion of the image data received as the input signal IP. The resolution conversion is performed when the number of the pixels arranged in the X-direction and the number of the pixels arranged in the Y-direction (i.e., the resolution of the image data received as the input signal IP) does not correspond to the number of the dimming pixels 148 arranged in the X-direction and the number of the dimming pixels 148 arranged in the Y-direction provided on the dimming panel 80. In the conversion, the resolution converter 12 converts the resolution of the image data so as to correspond to the number of the dimming pixels 148 arranged in the X-direction and the number of the dimming pixels 148 arranged in the Y-direction provided on the dimming panel 80. The specific algorithm of the resolution conversion can employ known methods, such as a nearest neighbor method, and therefore, will not be described in detail. First data Sig1 output from the resolution converter 12 to the blurring processor 14 is data based on the input signal IP and is data that is converted in resolution by the resolution converter 12 when needed. When the number of the pixels arranged in the X-direction and the number of the pixels arranged in the Y-direction correspond to the number of the dimming pixels 148 arranged in the X-direction and the number of the dimming pixels 148 arranged in the Y-direction provided on the dimming panel 80, the resolution conversion is not performed by the resolution converter 12, and the resolution of the image data by the first data Sig1 is the same as the resolution of the image data input as the input signal IP.

The blurring cancel determiner 13 makes a determination regarding the fulfillment of the condition for application of the blurring region. Specifically, the blurring cancel determiner 13 determines whether the condition for application of the blurring region is fulfilled based on the information indicated by the image captured by the imaging device 90 and information stored in the register 16. The information indicated by the image captured by the imaging device 90 refers to, for example, whether the image captured by the imaging device 90 includes the point of view E, and if so, refers to the position of the point of view E in the imaging region AoV, as described above. The information stored in the register 16 will be described later.

The blurring processor 14 performs various processes related to the application of the blurring process. In the embodiment, the blurring region derived by the blurring processor 14 is, for example, the blurring region wid centered on the center CL described with reference to FIG. 6. In the following specific examples, to give priority to ease of understanding, a case is exemplified where the resolution converter 12 does not convert the resolution and where the input values Ic and the output values g0(Ic) have 8-bit gradation values.

To give a specific example, the RGB gradation values indicated by the input values Ic of one of the pixels included in the image data received by the signal processor 10 as the input signal IP are assumed to be (R, G, B)=(255, 255, 255). In this case, the first sub-pixel 49R, the second sub-pixel 49G, and the third sub-pixel 49B of a pixel 48 (hereinafter, referred to as a center pixel 48) that are given the output values g0(Ic) corresponding to the input values Ic are each controlled to have the highest (100%) degree of light transmission within a predetermined control range (0% to 100%)

of the degree of light transmission. The dimming pixel 148 located in the Z-direction with respect to the center pixel 48 is regarded as being located at the center CL and is controlled to have the highest (100%) degree of light transmission within a predetermined control range (0% to 100%) of the degree of light transmission. Assuming that pixels 48, other than the center pixel 48, included in the blurring region wid centered on the center pixel 48 are referred to as the other pixels 48. In addition, assuming that the RGB gradation values indicated by the input values Ic serving as a source of the output values g0(Ic) to be given to the other pixels 48 are (R, G, B)=(0, 0, 0). In this case, the dimming pixels 148 located in the Z-direction with respect to the other pixels 48 included in the blurring region wid are controlled to have a degree of light transmission indicated by, for example, "LEVEL" illustrated in FIG. 6 when the blurring process is applied. To give a specific example with reference to FIG. 6, the degree of light transmission of the dimming pixel 148 located in the Z-direction with respect to a pixel 48 located five pixels away from the center pixel 48 in the X-direction is controlled to correspond to a dimming gradation value (light control gradation value) LV5. The degrees of light transmission of the dimming pixels 148 in other positions are also controlled under the same concept.

Assuming that a dimming pixel 148 located at the center CL illustrated in FIG. 6 is referred to as a center dimming pixel 148 and a pixel 48 located at the center CL is referred to as a center pixel 48. The setting of the degrees of light transmission of the dimming pixels 148 within the blurring region wid where the degree of light transmission of the center dimming pixel 148 is set to 100% corresponds to the setting when the degree of light transmission of the center pixel 48 is 100%. When the degree of light transmission of the center pixel 48 is 0%, where Q is a value in a range from 0 (inclusive) to 100 (exclusive), the degree of light transmission of the center dimming pixel 148 is set to 0%, and the degree of light transmission set for each of the dimming pixels 148 within the blurring region wid is (Q/100) times the degree of light transmission set in accordance with the degree of separation (DISTANCE (px)) from the center CL illustrated in FIG. 6. If the degree of light transmission to be set for the dimming pixel 148 correspondingly to the output values g0(Ic) given to the pixel 48 located in the Z-direction with respect to the dimming pixel 148 is higher than the degree of light transmission to be set for the dimming pixel 148 by the application of the blurring process, priority is given to the degree of light transmission to be set for the dimming pixel 148 correspondingly to the output values g0(Ic). If one of the dimming pixels 148 is located within a region in which a plurality of the blurring regions wid set so as to be centered on the respective pixels 48 serving as the centers CL are overlapping one another, the highest degree of light transmission among the degrees of light transmission set for the respective blurring regions wid is reflected to the one dimming pixel 148.

To summarize the specific examples described above, when one of the dimming pixels 148 is assumed as a pixel of interest, each of the pixels 48 included in the blurring region wid centered on the pixel of interest as viewed from the front point of view is considered to be one of a plurality of reference pixels. That is, the pixel of interest refers to one of the dimming pixels 148, and the reference pixel refers to the pixel 48. The reference pixel is set for the purpose of referring to the input values Ic to determine the dimming gradation value of the pixel of interest based on the input values Ic given to the pixel 48. The pixels 48 to which the blurring process is not applied are not considered as the reference pixels, except for the pixel 48 located in the Z-direction with respect to the pixel of interest (i.e., except for the pixel 48 having the positional relation with the pixel of interest that corresponds to the center CL). Based on the output values g0(Ic) given to each of the reference pixels and the degree of separation (DISTANCE (px)) between each of the reference pixels and the pixel of interest, the blurring processor 14 individually determines the degree of light transmission (candidate additional value) to be set for the pixel of interest corresponding to the degree of light transmission of each of the reference pixels. The blurring processor 14 determines the candidate additional value that gives the highest degree of light transmission among the candidate additional values obtained for one pixel of interest, as an additional value that represents the degree of light transmission to be applied to the one pixel of interest. The one pixel of interest is controlled by the dimming panel driver 140 so as to have the degree of light transmission corresponding to the additional value. The blurring processor 14 individually determines the additional value for each of the dimming pixels 148. The dimming signal DI includes information corresponding to the thus determined additional value for each of the dimming pixels 148. To be exact, the information included in the dimming signal DI of the embodiment is information indicating the degree of light transmission of each of the dimming pixels 148 determined by reflecting the gamma correction process by the second gamma converter 15 to the additional value of the dimming pixel 148.

The second gamma converter 15 performs the gamma correction process when the gamma correction is required for the dimming gradation value. In the embodiment, the second gamma converter 15 performs the gamma correction process such that a gamma curve between a case where both the dimming panel 80 and the display panel 30 are at the lowest gradation (0) and a case where both the dimming panel 80 and the display panel 30 are at the highest gradation (255 in the case of eight bits) is a desired gamma curve (for example, a gamma curve corresponding to a gamma value of 2.2). When g1 denotes a coefficient used in the gamma correction, the dimming gradation value after the gamma correction process is performed by the second gamma converter 15 can be represented as g1($IC_{max}$+A).

The first gamma converter 11 outputs the output image signal OP to the display panel 30. The output image signal OP is a set of the values g0(Ic) described above for the respective pixels 48. Each of the pixels 48 is driven in accordance with the value g0 (Ic) by operation of the display panel driver 40. The second gamma converter 15 outputs the dimming signal DI to the dimming panel 80. The dimming signal DI is a set of the values g1($IC_{max}$+A) described above for the respective dimming pixels 148. Each of the dimming pixels 148 is driven in accordance with the value g1($IC_{max}$+A) by operation of the dimming panel driver 140. That is, the dimming panel 80 operates such that the degree of transmission of light through each of the dimming pixels 148 corresponds to the dimming gradation value thereof. In the embodiment, all the sub-pixels 49 included in one of the dimming pixels 148 are driven such that each of the sub-pixels 49 has a degree of transmission of light corresponding to the dimming gradation value of the one of the dimming pixels 148.

The register 16 includes a storage circuit (such as a flash memory) that stores therein information for determining an "area regarded as the screen edges and the vicinities thereof". Specifically, the register 16 stores therein a value (D) for regarding the Dth pixels 48 from each of the edges as the pixels 48 included in the "area regarded as the screen edges and the vicinities thereof". In the embodiment, D is a natural number, but may be set to 0.

More specifically, each of the pixels 48 located at both edges of the display area OA in the X-direction, each of the pixels 48 located at both edges of the display area OA in the Y-direction, or each of the pixels 48 located at both edges of the display area OA in the X-direction and both edges of the display area OA in the Y-direction is regarded as the "first pixel 48 from the edge". Thus, for example, when D=1, each "first pixel 48 from the edge" is regarded as the pixel 48 included in the "area regarded as the screen edges and the vicinities thereof"; and the other pixels 48 located inside thereof in the display area OA are regarded as the pixels 48 not included in the "area regarded as the screen edges and the vicinities thereof". When D=2, the "first pixels 48 from the edges" and the pixels 48 adjacent to the "first pixels 48 from the edges" are regarded as the pixels 48 included in the "area regarded as the screen edges and the vicinities thereof". When D is equal to or larger than three, the same concept is applied to determine the pixels 48 included in the "area regarded as the screen edges and the vicinities thereof".

The blurring process is not applied to the pixels 48 included in the "area regarded as the screen edges and the vicinities thereof" unless the point of view E of the user is in a position from which the "area regarded as the screen edges and the vicinities thereof" is viewed from the front. That is, unless the point of view E of the user is in a position from which the "area regarded as the screen edges and the vicinities thereof" is viewed from the front, the pixels 48 included in the "area regarded as the screen edges and the vicinities thereof" are regarded as the pixels 48 not satisfying the condition for applying the blurring process, and, for example, the control of the degree of light transmission as illustrated in FIG. 6 is not applied to the dimming pixels 148 included in the blurring region wid centered on the pixels 48 not satisfying the condition except for the dimming pixel 148 corresponding to the center CL. The display device 1 need not include the imaging device 90. If the imaging device 90 is not included, the determination is not made as to whether the user is viewing the outer edge Ed and the vicinity thereof in the front view or the oblique view. In this case, the blurring process at and near the outer edge Ed is automatically canceled.

In contrast, the blurring process is applied to the pixels 48 not included in the "area regarded as the screen edges and the vicinities thereof", regardless of the position of the point of view E of the user. That is, for example, the control of the degree of light transmission as illustrated in FIG. 6 is applied to the dimming pixels 148 included in the blurring region wid centered on such pixels 48. In the embodiment, when the point of view E of the user is in a position from which the "area regarded as the screen edges and the vicinities thereof" is viewed from the front, the blurring process is applied even to the pixels 48 included in the "area regarded as the screen edges and the vicinities thereof". However, the relation between the point of view E of the user and the application of the blurring process may be omitted. That is, the process related to the acquisition of the point of view E of the user and the imaging device 90 may be omitted, and the blurring process may not be automatically applied to the pixels 48 included in the "area regarded as the screen edges and the vicinities thereof".

For example, the blurring cancel determiner 13 identifies the position of the point of view E of the user based on the image captured by the imaging device 90, and determines whether to apply the blurring process to each of the pixels 48 based on the position of the point of view E and the value (D) set in the register 16. The blurring cancel determiner 13 outputs, to the blurring processor 14, mapping data of the pixels 48 serving as second data Sig2 indicating which of the pixels 48 included in the display area OA are to undergo the blurring process, and which of the pixels 48 are not to undergo the blurring process. The blurring processor 14 determines the additional value of each of the dimming pixels 148 based on the first data Sig1 and the second data Sig2. The blurring cancel determiner 13 may be integrated into the blurring processor 14, for example, as a part of the functions of the blurring processor 14.

The following describes the blurring processor 14 that performs processing related to the application of the blurring process described above, in more detail with reference to FIG. 19.

Figure 19:
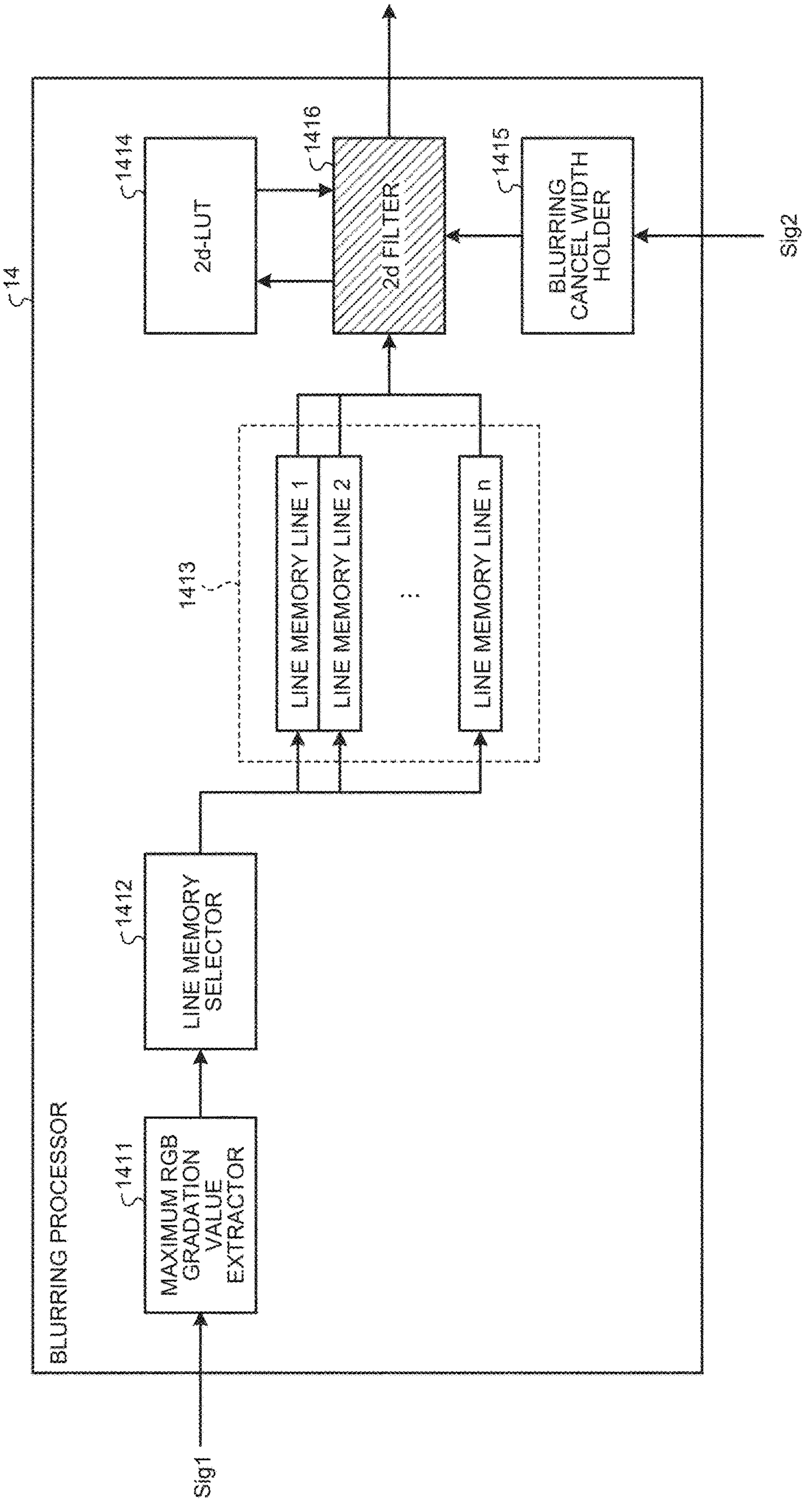
FIG. 19 is a block diagram illustrating a functional configuration example of a blurring processor.

FIG. 19 is a block diagram illustrating a functional configuration example of the blurring processor 14. The blurring processor 14 includes a maximum RGB gradation value extractor (maximum RGB gradation value extraction circuit) 1411, a line memory selector 1412, a line memory circuit 1413, a two-dimensional lookup table (2d-LUT) 1414, a blurring cancel width holder (blurring cancel width holding register) 1415, and a two-dimensional (2d) filter 1416.

The maximum RGB gradation value extractor 1411 extracts and outputs the highest gradation values from among the RGB gradation values indicated by the input values (Ic). For example, the highest gradation value in (R, G, B)=(255, 128, 100) is the gradation value (255) of R. The highest gradation value in (R, G, B)=(0, 128, 100) is the gradation value (128) of G. The highest gradation value in (R, G, B)=(0, 0, 100) is the gradation value (100) of B. The degree of light transmission of the pixel 48 given the output value (g0(Ic)) corresponding to the input value (Ic) reflects the highest gradation value among the RGB gradation values indicated by the input values (Ic).

The line memory selector 1412 stores the output of the maximum RGB gradation value extractor 1411 in one of a plurality of line memories included in the line memory circuit 1413. The line memory circuit 1413 includes the line memories corresponding to the number of the scan lines SCL. Each of the line memories is a storage circuit including gradation value storages corresponding to the number of the pixels 48 sharing one scan line SCL. The highest gradation value extracted from which input value (Ic) is stored in which of the gradation value storages of which of the line memories depends on the following correspondence relation. The correspondence relation is a correspondence relation between the position of the pixel indicating the input value (Ic) in the input signal IP (image data) and the position of the pixel 48 given the output value (g0(Ic)) corresponding to the input value (Ic) in the display area OA. Therefore, when the line memory circuit 1413 has fully stored therein the highest gradation values extracted from the input values (Ic) of all the pixels included in the input signal IP of one piece of image data, the line memory circuit 1413 has stored therein a highest gradation value map of the display area OA corresponding to the image data (information indicating the highest gradation values of the sub-pixels 49 included in the respective pixels 48). The degree of light transmission of the dimming pixels 148 is controlled according to the highest gradation value map of the display area OA.

The 2d-LUT 1414 holds information indicating the size of the blurring region (for example, the blurring region wid) and the distribution of the degree of light transmission (for example, the distribution of the degree of light transmission according to the distance from the center CL, as illustrated by the graph of LV in FIG. 6) within the blurring region when the blurring process is applied. In the embodiment, the 2d-LUT 1414 holds the data corresponding to the graph illustrated in FIG. 6 in a look-up table (LUT) format, for example. However, the specific blurring region, the degree of light transmission, and the format of the data held by the 2d-LUT 1414 are not limited to those described above, but can be changed as appropriate. The blurring cancel width holder 1415 is a register that holds the second data Sig2.

The 2d filter 1416 determines the degree of light transmission (dimming gradation value) of each of the dimming pixels 148 based on the highest gradation value map of the display area OA stored in the line memory circuit 1413, the information stored in the 2d-LUT 1414, and the second data Sig2 held by the blurring cancel width holder 1415. The determination of the dimming gradation value of each of the dimming pixels 148 is performed, for example, as described above in the description of the determination of the degree of light transmission of the dimming pixels 148 described in the description of the application of the blurring process, and will be described below as the details of processing by the 2d filter 1416 with reference to the flowchart in FIG. 20.

Figure 20:
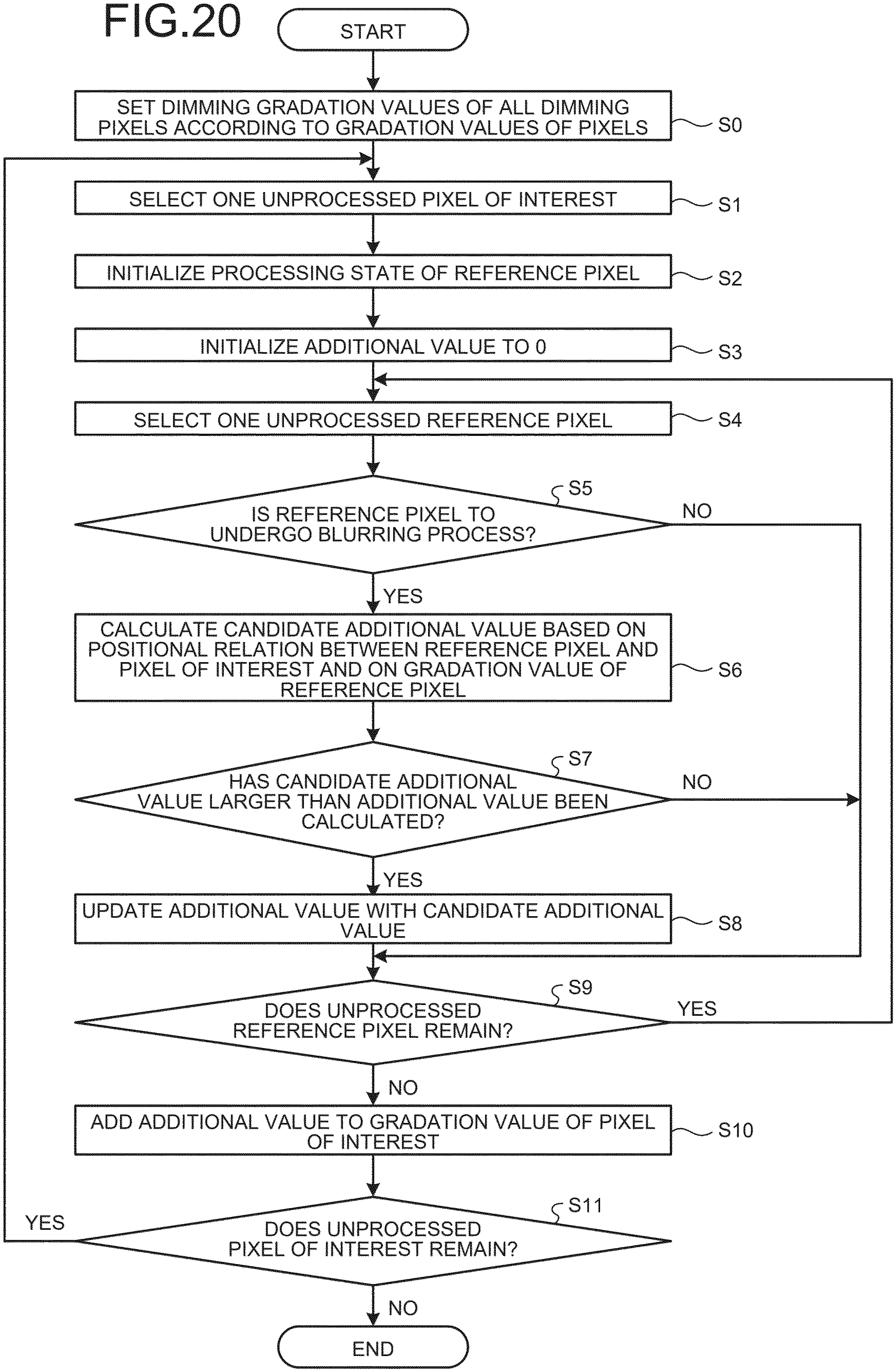
FIG. 20 is a flowchart illustrating processing by a two-dimensional (2d) filter.

FIG. 20 is the flowchart illustrating the processing by the 2d filter 1416. First, the dimming gradation values of all the dimming pixels 148 included in the dimming panel 80 are set in accordance with the input values Ic indicated by the pixel signals included in the input signal IP (Step S0). That is, first, as a basic precondition, the degree of light transmission of each of the dimming pixels 148 is set so as to correspond to a pixel signal given to the pixel 48 that overlaps the dimming pixel 148 when viewed from the front point of view. The degree of light transmission set for each of the dimming pixel 148 by the process at Step S0 is not reduced by processes at Step S1 and later steps. After the process at Step S0, the 2d filter 1416 selects one unprocessed pixel of interest (Step S1). At Step S1, the 2d filter 1416 regards, as unprocessed pixels of interest, the dimming pixels 148 for which the dimming gradation values have not yet been determined among the dimming pixels 148 provided on the dimming panel 80, and selects one of the unprocessed pixels of interest as a pixel to be processed.

After the process at Step S1, the 2d filter 1416 initializes the processing state of the reference pixels (Step S2). The reference pixels are different between pixels of interest. The reference pixels are pixels 48 on each of which information (degree of light transmission) is to be referred to when determining the dimming gradation value of the dimming pixel 148 regarded as one pixel of interest. Therefore, each time the pixel of interest is updated in the process at Step S1, the processing states for the reference pixels are also initialized in the process at Step S2. After the process at Step S2, the 2d filter 1416 initializes the additional value for the pixel of interest selected at Step S1 to 0 (Step S3).

The 2d filter 1416 selects, as an unprocessed reference pixel, one reference pixel that has not yet undergone processes at Step S5 and later steps from among the reference pixels corresponding to the latest pixel of interest selected in the process at Step S1 (Step S4). The term "the reference pixels corresponding to the latest pixel of interest" refers to, for example, the pixels 48 included in the blurring region wid centered on the pixel of interest as viewed from the front point of view, as described above. This is an example in the case where the information held by the 2d-LUT 1414 corresponds to the graph illustrated in FIG. 6. Therefore, if the specific information held by the 2d-LUT 1414 differs from the graph illustrated in FIG. 6, the pixel 48 selected as the reference pixel can also differ.

The 2d filter 1416 determines whether the reference pixel selected at Step S4 is to undergo the blurring process (Step S5). Specifically, with reference to the second data Sig2 held in the blurring cancel width holder 1415, the 2d filter 1416 determines whether the pixel 48 serving as the reference pixel selected at Step S4 is the pixel 48 satisfying the condition for applying the blurring process.

If the reference pixel selected at Step S4 is to undergo the blurring process (Yes at Step S5), the 2d filter 1416 calculates the candidate additional value based on the positional relation between the reference pixel and the pixel of interest and on the gradation values of the reference pixel (Step S6). The term "the positional relation between the reference pixel and the pixel of interest" refers to the degree of separation (DISTANCE (px)) from the center CL illustrated in FIG. 6. That is, assuming that the position of the reference pixel selected at Step S4 is the center CL, the 2d filter 1416 identifies how far away from the center CL the pixel of interest selected at Step S1 is, and applies the result to the degree of separation (DISTANCE (px)) illustrated in FIG. 6. The 2d filter 1416 identifies the degree of light transmission of the reference pixel selected at Step S4 as the gradation values of the reference pixel with reference to the line memory circuit 1413. The degree of light transmission of the reference pixel is the highest gradation value of the RGB gradation values that is extracted from the input values (Ic) serving as the source of the output values (g0 (Ic)) given to the pixel 48 serving as the reference pixel, and stored in the line memory. For example, the candidate additional value is calculated by adjusting the Level (refer to FIG. 6) identified by the positional relation between the reference pixel and the pixel of interest, assuming the gradation value of the reference pixel to be Q % (or 100%).

The 2d filter 1416 determines whether a candidate additional value larger than the additional value held at the completion of the last performed process at Step S6 has been calculated in the last performed process at Step S6 (Step S7). If the candidate additional value larger than the additional value has been calculated (Yes at Step S7), the 2d filter 1416 updates the additional value with the candidate additional value (Step S8).

After the end of the process at Step S8 or if the candidate additional value equal to or smaller than the additional value is calculated (No at Step S7), the 2d filter 1416 checks whether an unprocessed reference pixel remains (Step S9). If an unprocessed reference pixel remains (Yes at Step S9), the process at Step S4 is performed.

If, instead, no unprocessed reference pixel remains (No at Step S9), the 2d filter 1416 adds the additional value to the gradation value of the pixel of interest (Step S10). Since the gradation value of the pixel of interest before the additional value is added is 0, the additional value is reflected as the gradation value of the pixel of interest, that is, the dimming gradation value. The process at Step S10 determines the dimming gradation value of the pixel of interest selected in the last performed process at Step S1.

After the process at Step S10, the 2d filter 1416 checks whether an unprocessed pixel of interest, that is, a pixel of interest for which the dimming gradation value has not been determined remains (Step S11). If the unprocessed pixel of interest remains (Yes at Step S11), the process at Step S1 is performed. If, instead, no unprocessed pixel of interest remains (No at Step S11), the processing of the 2d filter 1416 corresponding to one piece of the image data (one frame of the display output by the display area OA) ends.

The process of determining the dimming gradation value by the 2d filter 1416 can also be expressed based on Expressions (4), (5), (6), (7), (8), and (9) given below. Expression (7) indicates $f_{x,y}$ when Expressions (4), (5), and (6) all hold, and Expression (8) indicates $f_{x,y}$ when one or more of Expressions (4), (5), and (6) do not hold.

$$Is_{x,y} > Ic \quad (4)$$

$$D < Xs < X\max - D \quad (5)$$

$$D < Ys < Y\max - D \quad (6)$$

$$f_{x,y} = e[Ps_{x,y} - P3] \times |Is_{x,y} - Ic| \quad (7)$$

$$f_{x,y} = 0 \quad (8)$$

$$A = \max(f_{x,y}) \quad (9)$$

$Is_{x,y}$ in Expressions (4) and (7) is the dimming gradation value of one of the pixels 48 that is located within the blurring region (for example, the blurring region wid) centered on one of the dimming pixels 148 serving as the pixel of interest, that is, the dimming pixel 148 determined by applying the blurring process correspondingly to the gradation value of one of the reference pixels.

Ic in Expressions (4) and (7) is the dimming gradation value of the pixel 48 that overlaps the dimming pixel 148 serving as the pixel of interest when viewed from the front point of view, that is, the dimming pixel 148 when the dimming pixel 148 is located over the center CL of the pixel 48.

D in Expressions (5) and (6) is a value indicating the distance from the edge set in the register 16. That is, Expression (5) represents the coordinate in the X-direction of the pixel 48 that satisfies the condition for applying the blurring process. Expression (6) represents the coordinate in the Y-direction of the pixel 48 that satisfies the condition for applying the blurring process.

$f_{x,y}$ in Expression (7) represents a candidate adjustment value (value to be calculated by Expression (7)) calculated correspondingly to $Is_{x,y}$ in Expression (4). e in Expression (7) is a value set in advance according to the positional relation between the pixel of interest and the reference pixel for the pixel of interest and is held as information included in the LUT. For example, the 2d-LUT 1414 holds the LUT.

$Ps_{x,y}$ in Expression (7) represents the coordinates of the pixel 48 that is assumed as one reference pixel when calculating $Is_{x,y}$ in Expression (4).

P3 in Expression (7) represents the coordinates of the dimming pixel 148 serving as the pixel of interest.

Expression (9) indicates that the largest value of the values $f_{x,y}$ that are calculated for all the reference pixels located within the blurring region (for example, the blurring region wid) centered on the dimming pixel 148 serving as the pixel of interest is employed as A in g1($IC_{max}$+A) mentioned above.

As described above, according to the embodiment, the display device 1 includes a display panel (display panel 30) provided with a plurality of pixels (pixels 48), a dimming panel (dimming panel 80) that is disposed so as to face the display panel on one surface side of the display panel and is provided with a plurality of dimming pixels (dimming pixels 148), and a light source (light source device 50) that emits light that travels from the dimming panel toward the display panel.

In the display device 1, when a pixel (pixel 48) is present that is controlled to transmit light in accordance with an input image signal (for example, the input signal IP) and a predetermined condition is satisfied, a blurring process is applied so that a plurality of dimming pixels (dimming pixels 148) transmit light, a blurring region (for example, the blurring region BWA1) is formed that is a region including the dimming pixels to which the blurring process is applied, and light from the light source (light source device 50) is transmitted through the blurring region and the pixel and emitted to the other surface side of the display panel (display panel 30).

In the display device 1, when the pixel (pixel 48) is present that is controlled to transmit light in accordance with the input image signal (for example, the input signal IP) and the predetermined condition is not satisfied, the blurring region is not formed, a dimming pixel (dimming pixel 148) located in a position overlapping the pixel on a straight line along a direction in which the display panel faces the dimming panel (dimming panel 80) (for example, a straight line along the Z-direction) is controlled to transmit light, and light from the light source (light source device 50) is transmitted through the dimming pixel and the pixel and emitted to the other surface side of the display panel (display panel 30).

The predetermined condition is that the pixel (pixel 48) controlled to transmit light is at a predetermined distance or farther from an outer edge of a display area (display area OA) provided with a plurality of pixels (pixels 48) on the display panel (display panel 30). The predetermined distance may be determined by the number of pixels (pixels 48) counted from an end in each of the X-direction and the Y-direction, in the same manner as, for example, the value of D described above, or may be a value indicating the distance from the outer edge of the display area. When the value indicating the distance is determined, the display device (display device 1) holds information indicating in advance which of the pixels (pixels 48) are within the region of the value indicating the distance from the outer edge.

Thus, in the display device 1, when the pixel 48 is present that is controlled to be lit in white in accordance with the input image signal (for example, the input values (Ic) of (R, G, B)=(255, 255, 255) included in the input signal IP) and the predetermined condition is satisfied, the blurring process is applied so that the dimming pixels 148 transmit light, the blurring region (for example, the blurring region BWA1) is formed that is a region including the dimming pixels to which the blurring process is applied, and light from the light source device 50 is transmitted through the pixel 48, and emitted to the other surface side of the display panel 30. The predetermined condition herein is that the pixel (pixel 48) controlled to transmit light, that is, the pixel 48 controlled to be lit up in white is at a predetermined distance or farther from an outer edge of the display area (display area OA) provided with a plurality of pixels (pixels 48) on the display panel (display panel 30).

In the display device 1, when the pixel 48 is present that is controlled to be lit in white in accordance with the input image signal (for example, (R, G, B)=(255, 255, 255)) included in the input signal IP) and the predetermined condition is not satisfied, the blurring region is not formed, the dimming pixel 148 located in a position overlapping the pixel 48 on a straight line along a direction in which the display panel 30 faces the dimming panel 80 (for example, a straight line along the Z-direction) is controlled to transmit light, and light from the light source device 50 is transmitted through the dimming pixel 148 and the pixel 48 and emitted to the other surface side of the display panel 30. The predetermined condition herein is that the pixel (pixel 48) controlled to transmit light, that is, the pixel 48 controlled to be lit up in white is at a predetermined distance or farther from an outer edge of the display area (display area OA) provided with a plurality of pixels (pixels 48) on the display panel (display panel 30).

According to the display device (display device 1), the blurring region is formed to enhance the contrast of the image. The double image and the image chipping described above can also be reduced. In addition, by preventing the blurring region from being formed within a region at the predetermined distance or farther from the outer edge of the display area (display area OA) provided with the pixels (pixels 48), an image as if unintended light leakage occurs at and near the outer edge can be restrained from being output. Therefore, the display device is capable of both providing higher image contrast and reducing the output of the image as if unintended light leakage occurs at and near the outer edge.

If the pixel (pixel 48) that is controlled to be lit up in white is located adjacent to the outer edge of the display area (display area OA), the predetermined condition described above is not satisfied. This condition setting can more reliably reduce the output of the image as if unintended light leakage occurs at and near the outer edge The information indicating the predetermined distance is set in a register (register 16) in advance. Setting the information more appropriately in register can more reliably reduce the output of the image as if unintended light leakage occurs at and near the outer edge.

In a case where the display device 1 includes an imaging device (imaging device 90) with an imaging region (imaging region AoV) in which a space facing the display panel (display panel 30) is included, when a point of view (for example, the point of view E) of a user is identified as being within a predetermined region based on an image captured by the imaging device, the blurring process is applied so that a plurality of dimming pixels (dimming pixels 148) transmit light, the blurring region is formed that is a region including the dimming pixels (dimming pixels 148) to which the blurring process is applied, and light from the light source (light source device 50) is transmitted through the blurring region and the pixels and emitted to the other surface side of the display panel, even when the pixel (pixel 48) not satisfying the predetermined condition described above is controlled to be lit up in white. As a result, when the pixels 48 located near the outer edge of the display area OA are viewed by the user substantially from the front, the contrast of the image can be enhanced by applying the blurring process to the dimming pixels 148 located, in the front view, around the pixels 48 that are viewed from the front, and therefore, are unlikely to be viewed as if light leakage occurs.

In the embodiment, the blurring region wid described with reference to FIG. 6 applies to both the X-direction and the Y-direction, but may apply to only one of them. A blurring region similar to the blurring region wid may be set in directions orthogonal to the Z-direction and intersecting the X-direction and the Y-direction under the same concept as in the X-direction and the Y-direction, and a relation between the pixel of interest and the reference pixel may be set and held in the 2d-LUT 1414.

Other operational advantages accruing from the aspects described in the embodiment herein that are obvious from the description herein or that are appropriately conceivable by those skilled in the art will naturally be understood as accruing from the present disclosure.

What is claimed is:

1. A display device comprising:

a display panel comprising a plurality of pixels;

a dimming panel that is disposed so as to face the display panel on one surface side of the display panel and comprises a plurality of dimming pixels; and a light source configured to emit light that travels from the dimming panel toward the display panel, wherein in controlling the pixels in accordance with an input image signal such that at least one of the pixels is lit up in white, when a first pixel disposed farther than a predetermined distance from a border between a display area of the display panel and a frame area of the display panel is lit up in white, a blurring process is applied such that more than one of the dimming pixels transmit light, a blurring region is formed that is a region including the dimming pixels to which the blurring process is applied, and light from the light source is transmitted through the blurring region and the first pixel and emitted to another surface side of the display panel, and when a second pixel that is disposed closer to the border than the first pixel and that is not farther than the predetermined distance from the border is lit up in white, the blurring process is not applied.

2. The display device according to claim 1, wherein the second pixel is disposed adjacent to the border.

3. The display device according to claim 1, wherein the display panel receives a signal obtained by applying a first gamma correction to the input image signal, and the dimming panel receives a signal obtained by applying a second gamma correction different from the first gamma correction to a signal obtained by applying the blurring process to the input image signal.

* * * * *